US011947590B1

(12) United States Patent
Chakraborty et al.

(10) Patent No.: US 11,947,590 B1
(45) Date of Patent: Apr. 2, 2024

(54) SYSTEMS AND METHODS FOR CONTEXTUALIZED VISUAL SEARCH

(71) Applicant: Amazon Technologies, Inc., Seattle, WA (US)

(72) Inventors: Ria Chakraborty, Bangalore (IN); Madhur Popli, Ludhiana (IN); Rishi Kishore Verma, Bangalore (IN); Pranesh Bhimarao Kaveri, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 246 days.

(21) Appl. No.: 17/476,292

(22) Filed: Sep. 15, 2021

(51) Int. Cl.
*G06F 16/00* (2019.01)
*G06F 16/538* (2019.01)
*G06F 16/54* (2019.01)
*G06F 18/24* (2023.01)
*G06N 3/045* (2023.01)
*G06Q 30/0601* (2023.01)

(52) U.S. Cl.
CPC ............ *G06F 16/538* (2019.01); *G06F 16/54* (2019.01); *G06F 18/24* (2023.01); *G06N 3/045* (2023.01); *G06Q 30/0641* (2013.01)

(58) Field of Classification Search
None
See application file for complete search history.

(56) References Cited

U.S. PATENT DOCUMENTS

| 10,810,454 B2 | 10/2020 | Mino |
| 2018/0129898 A1* | 5/2018 | Mino ............... G06F 16/532 |
| 2020/0293890 A1 | 9/2020 | Baker |

FOREIGN PATENT DOCUMENTS

WO   WO-2014164158 A1 * 10/2014 ............... G06K 9/46

OTHER PUBLICATIONS

Alexey Bochkovskiy, Chien-Yao Wang, and Hong-Yuan Mark Liao. 2020. "YOLOv4: Optimal Speed and Accuracy of Object Detection". arXiv:2004.10934 [cs.CV], pp. 1-17.
Zhaowei Cai and Nuno Vasconcelos. 2017. "Cascade R-CNN: Delving into High Quality Object Detection", arXiv:1712.00726 [cs.CV], pp. 6154-6162.
(Continued)

*Primary Examiner* — Tuankhanh D Phan
(74) *Attorney, Agent, or Firm* — Robert C. Kowert; Kowert, Hood, Munyon, Rankin & Goetzel, P.C.

(57) ABSTRACT

Embodiments of a contextualized visual search (CVS) system are disclosed capable of isolating target images of items that contain instances of a previously-unseen query image from a large database of target images. In embodiments, the system is used to implement an interactive query interface of an e-commerce portal, which allows the user to specify the query image (e.g. a logo) to be searched. The system converts the query image into a feature vector using a first machine learning model, and compares the feature vector to feature vectors of target images using a second machine learning model to find matching target images that contain an instance of the query image. The system then returns a query result indicating a list of items associated with matched target images. In embodiments, the query results may be ranked based on a set of personalized factors associated with the user.

20 Claims, 9 Drawing Sheets

(56) References Cited

OTHER PUBLICATIONS

Xizhou Zhu, Weijie Su, Lewei Lu, Bin Li, Xiaogang Wang, and Jifeng Dai. "Deformable DETR: Deformable Transformers for End-to-End Object Detection," Published as a conference paper at ICLR 2021, arXiv:2010.04159 [cs.CV], pp. 1-16.
Jifeng Dai, Yi Li, Kaiming He, and Jian Sun. 2016. R-FCN: "Object Detection via Region-based Fully Convolutional Networks," arXiv:1605.06409 [cs.CV], pp. 1-11.
J. Deng, W. Dong, R. Socher, L.-J. Li, K. Li, and L. Fei-Fei. 2009. "ImageNet: A Large-Scale Hierarchical Image Database". In CVPR09, pp. 1-8.
M. Everingham, et al., "The Pascal Visual Object Classes Challenge: A Retrospective," International Journal of Computer Vision 111, 1 (Jan. 2015), pp. 1-38.
Qi Fan, Wei Zhuo, Chi-Keung Tang, and Yu-Wing Tai. 2020. "Few-Shot Object Detection with Attention-RPN and Multi-Relation Detector". IEEE Xplore, arXiv:1908.01998 [cs.CV], pp. 1-10.
Chelsea Finn, Pieter Abbeel, and Sergey Levine. "Model-Agnostic Meta-Learning for Fast Adaptation of Deep Networks". arXiv:1703.03400 [cs.LG], Proceedings of the 34 th International Conference on Machine Learning, Sydney, Australia, PMLR 70, 2017. Copyright 2017, pp. 1-10.
Ross Girshick, Jeff Donahue, Trevor Darrell, and Jitendra Malik. 2014. "Rich feature hierarchies for accurate object detection and semantic segmentation", IEEE Xplore, arXiv:1311.2524 [cs.CV], pp. 1-8.
Kaiming He, Xiangyu Zhang, Shaoqing Ren, and Jian Sun. 2015. "Deep Residual Learning for Image Recognition", IEEE Xplore, arXiv:1512.03385 [cs.CV], pp. 770-778.
Yihui He, Chenchen Zhu, Jianren Wang, Marios Savvides, and Xiangyu Zhang. 2019. Bounding Box Regression with Uncertainty for Accurate Object Detection:, IEEE Xplore, arXiv:1809.08545 [cs.CV], pp. 2888-2897.
Ting-I Hsieh, Yi-Chen Lo, Hwann-Tzong Chen, and Tyng-Luh Liu. 2019. "One-Shot Object Detection with Co-Attention and Co-Excitation," arXiv:1911.12529 [cs.CV], pp. 1-10.
Bingyi Kang, Zhuang Liu, Xin Wang, Fisher Yu, Jiashi Feng, and Trevor Darrell. 2019. "Few-shot Object Detection via Feature Reweighting," IEEE Xplore, arXiv:1812.01866 [cs.CV], pp. 8420-8429.
Leonid Karlinsky, Joseph Shtok, Sivan Harary, Eli Schwartz, Amit Aides, Rogerio Feris, Raja Giryes, and Alex M. Bronstein. 2018. "RepMet: Representative-based metric learning for classification and one-shot object detection". arXiv:1806.04728 [cs.CV], pp. 1-10.
Gregory Koch, Richard Zemel, and Ruslan Salakhutdinov. "Siamese Neural Networks for One-shot Image Recognition," Proceedings of the 32nd International Conference on Machine Learning, Lille, France, 2015. JMLR: W&CP vol. 37. Copyright 2015 by the author(s), pp. 1-8.
Yann Lecun, Léon Bottou, Yoshua Bengio, and Patrick Haffner. 1998. "Gradient-based learning applied to document recognition". In Proceedings of the IEEE. pp. 2278-2324.
Zhenguo Li, Fengwei Zhou, Fei Chen, and Hang Li. 2017. "Meta-SGD: Learning to Learn Quickly for Few-Shot Learning". arXiv:1707.09835 [cs.LG], pp. 1-11.
Tsung-Yi Lin, Michael Maire, Serge Belongie, Lubomir Bourdev, Ross Girshick, James Hays, Pietro Perona, Deva Ramanan, C. Lawrence Zitnick, and Piotr Dollár. Microsoft COCO: Common Objects in Context. D. Fleet et al. (Eds.): ECCV 2014, Part V, LNCS 8693, pp. 740-755, 2014. Copyright Springer International Publishing Switzerland 2014.
Wei Liu, Dragomir Anguelov, Dumitru Erhan, Christian Szegedy, Scott Reed, Cheng-Yang Fu, and Alexander C. Berg. 2016. "SSD: Single Shot MultiBox Detector". Lecture Notes in Computer Science (2016), pp. 21-37. https://doi.org/10.1007/978-3-319-46448-0_2.

Ilya Loshchilov and Frank Hutter. 2019. "Decoupled Weight Decay Regularization", Published as a conference paper at ICLR 2019, arXiv:1711.05101 [cs.LG], pp. 1-19.
Claudio Michaelis, Ivan Ustyuzhaninov, Matthias Bethge, and Alexander S. Ecker. 2019. "One-Shot Instance Segmentation," arXiv:1811.11507 [cs.CV], pp. 1-20.
Tsendsuren Munkhdalai and Hong Yu. 2017. "Meta Networks". Proceedings of the 34 th International Conference on Machine Learning, Sydney, Australia, PMLR 70, 2017. Copyright 2017 by the author(s), arXiv:1703.00837 [cs.LG], pp. 1-10.
Anton Osokin, Denis Sumin, and Vasily Lomakin. 2020. OS2D: "One-Stage One-Shot Object Detection by Matching Anchor Features". arXiv:2003.06800 [cs.CV], pp. 1-24.
Joseph Redmon, Santosh Divvala, Ross Girshick, and Ali Farhadi. 2016. "You Only Look Once: Unified, Real-Time Object Detection". arXiv:1506.02640 [cs.CV], pp. 779-788.
Joseph Redmon and Ali Farhadi. 2016. "YOLO9000: Better, Faster, Stronger", IEEE Xplore, arXiv:1612.08242 [cs.CV], pp. 1-9.
Mengye Ren, Eleni Triantafillou, Sachin Ravi, Jake Snell, Kevin Swersky, Joshua B. Tenenbaum, Hugo Larochelle, and Richard S. Zemel. "Meta-Learning for Semi-Supervised Few-Shot Classification", Published as a conference paper at ICLR 2018, arXiv:1803.00676 [cs.LG], pp. 1-15.
Shaoqing Ren, Kaiming He, Ross Girshick, and Jian Sun. 2016. "Faster R-CNN: Towards Real-Time Object Detection with Region Proposal Networks", arXiv:1506.01497 [cs.CV], pp. 1-9.
Hamid Rezatofighi, Nathan Tsoi, JunYoung Gwak, Amir Sadeghian, Ian Reid, and Silvio Savarese. 2019, "Generalized Intersection over Union: A Metric and A Loss for Bounding Box Regression," IEEE Xplore, arXiv:1902.09630 [cs.CV], pp. 658-666.
Bharat Singh, Mahyar Najibi, and Larry S. Davis. "SNIPER: Efficient Multi-Scale Training," arXiv:1805.09300 [cs.CV], 32nd Conference on Neural Information Processing Systems (NIPS 2018), Montréal, Canada, pp. 1-11.
Jake Snell, Kevin Swersky, and Richard S. Zemel. 2017. "Prototypical Networks for Few-shot Learning," arXiv:1703.05175 [cs.LG], pp. 1-13.
Hang Su, Xiatian Zhu, and Shaogang Gong. [n.d.]. "Open Logo Detection Challenge," In British Machine Vision Conference, 2018 copyright by authors, pp. 1-14.
Qianru Sun, Yaoyao Liu, Tat-Seng Chua, and Bernt Schiele. 2019. "Meta-Transfer Learning for Few-Shot Learning," IEEE Xplore, arXiv:1812.02391 [cs.CV], pp. 403-412.
Zhiqing Sun, Shengcao Cao, Yiming Yang, and Kris Kitani. 2020. "Rethinking Transformer-based Set Prediction for Object Detection," arXiv:2011.10881 [cs.CV], pp. 1-13.
Chuanqi Tan, Fuchun Sun, Tao Kong, Wenchang Zhang, Chao Yang, and Chunfang Liu. 2018. "A Survey on Deep Transfer Learning," arXiv:1808.01974 [cs.LG], pp. 1-10.
Ashish Vaswani, Noam Shazeer, Niki Parmar, Jakob Uszkoreit, Llion Jones, Aidan N. Gomez, Lukasz Kaiser, and Illia Polosukhin. 2017. "Attention Is All You Need". 31st Conference on Neural Information Processing Systems (NIPS 2017), Long Beach, CA, USA., arXiv:1706.03762 [cs.CL], pp. 1-11.
Oriol Vinyals, Charles Blundell, Timothy Lillicrap, Koray Kavukcuoglu, and Daan Wierstra, "Matching Networks for One Shot Learning," 30th Conference on Neural Information Processing Systems (NIPS 2016), Barcelona, Spain., arXiv:1606.04080 [cs.LG], pp. 1-9.
Jing Wang, Weiqing Min, Sujuan Hou, Shengnan Ma, Yuanjie Zheng, and Shuqiang Jiang. 2020, "LogoDet-3K: A Large-Scale Image Dataset for Logo Detection," IEEE Transactions on Multimedia, arXiv:2008.05359 [cs.CV], pp. 1-11.
Xin Wang, Thomas E. Huang, Trevor Darrell, Joseph E. Gonzalez, and Fisher Yu. 2020, "Frustratingly Simple Few-Shot Object Detection," arXiv:2003.06957 [cs.CV], pp. 1-12.
Yong Wang, Xiao-Ming Wu, Qimai Li, Jiatao Gu, Wangmeng Xiang, Lei Zhang, and Victor O. K. Li. 2018. "Large Margin Few-Shot Learning," arXiv:1807.02872 [cs.LG], pp. 1-17.
Xiaopeng Yan, Ziliang Chen, Anni Xu, Xiaoxi Wang, Xiaodan Liang, and Liang Lin. 2020. "Meta R-CNN: Towards General Solver for Instance-level Few-shot Learning," IEEE Xplore, arXiv:1909.13032 [cs.CV], pp. 9577-9586.

(56) References Cited

OTHER PUBLICATIONS

Gongjie Zhang, Zhipeng Luo, Kaiwen Cui, and Shijian Lu. 2021. "Meta-DETR: Few-Shot Object Detection via Unified Image-Level Meta-Learning," arXiv:2103.11731 [cs.CV], pp. 1-21.

Shifeng Zhang, Longyin Wen, Xiao Bian, Zhen Lei, and Stan Z. Li, 2018, "Single-Shot Refinement Neural Network for Object Detection," IEEE Xplore, arXiv:1711.06897 [cs.CV], pp. 1-10.

Weilin Zhang, Yu-Xiong Wang, and David A. Forsyth. 2020. "Cooperating RPN's Improve Few-Shot Object Detection," arXiv:2011.10142 [cs.CV], pp. 1-10.

Minghang Zheng, Peng Gao, Xiaogang Wang, Hongsheng Li, and Hao Dong. 2020. "End-to-End Object Detection with Adaptive Clustering Transformer," arXiv:2011.09315 [cs.CV], pp. 1-10.

\* cited by examiner

Visual Query 400

Query Image: 410

Additional Item Search Criteria: 420

Item Categories: Shirts, Hats, Mugs, Ornaments, Toys
Item Rating: > 4.0 Stars
Item Price: <= $ 40.00

[ Use Another Image ] 412

[ Change Categories ] 422
[ Change Criteria ] 424
[ Execute Search ] 426

Search Results: 430

[ Filter 436 ]
[ Sort 438 ]

location indicator 432
similarity score 434

Men's T-shirt (99%) — Not Interested
Xmas Tree Ornament (99%) — Not Interested
Sports Cap (90%) — Not Interested
Coffee Mug (80%) — Not Interested

*FIG. 4*

SYSTEMS AND METHODS FOR CONTEXTUALIZED VISUAL SEARCH

BACKGROUND

Electronic commerce systems are commonly used in our daily lives. With the ever-increasing customer base, e-commerce portals are evolving new mechanisms for engaging their customers. One such feature proposes to equip users with more expressive power when searching for products, in the form of visual searches. A visual search enables the customer to look for products using a query image instead of or in addition to keywords. However, state-of-the-art visual search systems only work well in certain situations where the target image closely matches the query image in terms of scale, or where the query image was previously used to train the underlying machine learning model. Current systems are not able to reliably identify product images that have a "contains" relationship with "unseen" query images, particular query images that occupy only a small area of the product image. Moreover, it is generally difficult to implement visual search systems for real-world e-commerce systems, which require search results to be delivered in real time (in a matter of seconds) for large numbers of online users.

BRIEF DESCRIPTION OF THE DRAWINGS

FIG. 4 illustrates an example graphical user interface that allows users perform visual searches of items in the CVS system, according to some embodiments.

Figure 1:
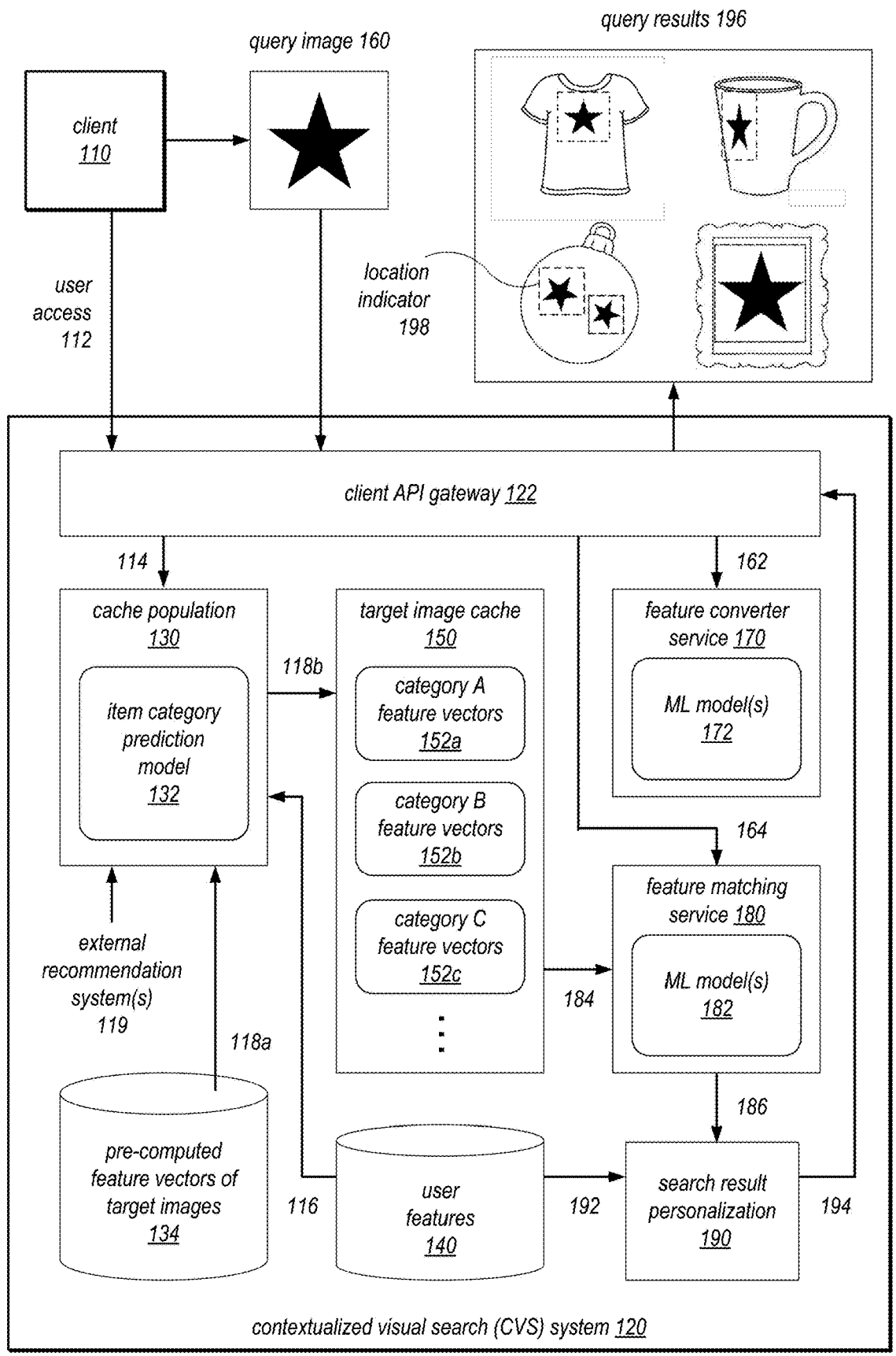
FIG. 1 is a block diagram illustrating a contextualized visual search (CVS) system that enables users to search for items using a query image, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Systems and methods are disclosed to implement a contextualized visual search system trained using machine learning techniques to identify target images that contain a query image. In some embodiments, the contextualized visual search system may be used to implement a product search interface of an e-commerce portal that allows users of the portal to search for products using query images (e.g. an icon or a logo).

Visual search enables users to look for items using an image instead of or in addition to keywords. On e-commerce websites, shoppers can use a query image to express something they are interested in and find the related products from the vast inventory and also suggest close matches. In the rapidly reducing attention spans of the digital age, visual search capabilities can be an effective tool to engaging customers. Visual searching also makes it easier for customers to discover items they want to purchase, in some cases finding items that are impossible to find based on other forms of searching.

Additionally, management of current e-commerce websites often involve different types of visual tasks that are performed manually. For example, the process of onboarding new products may require visual examinations of the new products to ensure that they comply with various compliance requirements. These compliance rules can range from having certain declarations displayed on the product packaging to mandating the presence of certain regulatory logos and pictograms. Every time these compliance rules change, the products will need to be reassessed, which leads to long wait times for product sellers wishing to onboard new product offerings. Manual checking of product images by human reviewers is labor-intensive and error-prone, and there is a general need to automate these types of tasks using machine learning systems.

Current visual searching techniques (e.g. "query by example" or QBE techniques) typically rely on similarity of scale-invariant features to retrieve the most relevant images to a query from a group of target images. As a result, current QBE systems tend to only work well in situations where the scope of the target images closely matches what is queried. These current systems are unable to reliably and consistently identify target images that have a "contains" relationship with the query image.

Moreover, unlike for most text searching applications, the training datasets used to train machine learning models in this context do not typically include extensive metadata outside of the images themselves. Manual labeling of the training data can be extremely time consuming and error prone. Large datasets of appropriate training images for this particular application are difficult to find.

Additionally, because the visual search system in this context will be used to power interactive searching on real-world e-commerce portals, the system should be able to return search results relatively quickly (e.g. in a matter of seconds), and to support a large number of concurrent users.

To address these problems in the state of the art and to improve upon current techniques for implementing visual search systems, this application discloses systems and methods for contextualized visual search (CVS), which can scan and isolate target images that contain one or more instances of a searched query image from a large database of target images. In some embodiments, the CVS system receives a query image as input (ideally a clean image that contains little to no background context), and returns target images (e.g. images of items or products) that contain the object represented in the query. The returned target images may be sorted by the similarity index of the object in the target image to that of the query, and in some embodiments ranked based on a personalized relevance order specific to the user. When combined with heuristics, embodiments of the CVS system can be used to identify and retrieve relevant images that were difficult to retrieve with other searching methods. In some embodiments, the CVS system can be used to further personalize the search results based on the user's propensity to purchase items shown in the results.

In some embodiments, the CVS system implements an example-based detector that uses a machine learning (ML) model to locate the query item in a target image, irrespective of the size, scale, and other transformational differences between the query item and the matching portion of the target image. The ML model is trained so that it can be generalized over a large population of previously-unseen query classes. In some embodiments, the CVS system may employ a smart caching system that is pre-populated based on a querying user's characteristics (e.g. prior search or purchase history). The cache may be used to store pre-computed feature vectors of target images of products that will be examined by the visual search. In some embodiments, the CVS system may be implemented as an online process that meets latency requirements of a real-time interactive system, so that the users' query will be returned relatively quickly (e.g. within a few seconds). For example, embodiments of the CVS system may examine the target images in parallel using a pool of compute instances.

In some embodiments, the ML model used by the CVS system is trained offline using machine learning techniques. The training data used to train the model may be based on an object detection dataset that is representative of the target domain (e.g. images of various products). The dataset is then converted into query-target pairs by cropping out labeled regions from the images and shuffling the cropped regions within a class. The original images become the targets and the shuffled crops become the queries. Transformations may be applied to the images by downscaling, padding, or stitching multiple target images together, in order to produce an augmented dataset that covers common types of transformations observed in real-life images. Additionally, synthetic data can be generated by pasting provided examples on random backgrounds with transformations. Using these techniques, a large corpus of training data can be easily generated for training the detector model. In some embodiments, these aspects of the training data generation process are fully configurable.

In some embodiments, the detector model may be a Deep Learning model that is trained to localize the query image in the target image. The model will perform the task by matching the query's features in target. Hence, the trained model is not restricted to only classes seen during training. The resulting model will serve as the example-based object detector in the CVS system, which can locate any query image in the provided target images. Advantageously, the detector model may be used to locate the query image regardless of the relative scale of the query and target images, so that the CVS system can reliably detect when a target image contains the query image.

FIG. 1 is a block diagram illustrating a contextualized visual search (CVS) system that enables users to search for items using a query image, according to some embodiments.

As shown, the figure depicts a CVS system 120 that is configured to interface with clients 110 to receive visual queries specifying a query image 160 and provide search results 196 indicating items that contain a view of the query image. In some embodiments, the client 110 may be a client computing device such as a personal computer or mobile device executing a web browser. The client 110 may be configured to display an interactive user interface (e.g. a graphical user interface or web interface) that allows a user of the device to perform the visual search. In some embodiments, the user interface may be provided as part of a web portal that allows users to browse and purchase products offered by an e-commerce service provider.

As shown, the user may access the CVS system 120 prior to the visual search request. The user access may be detected by the CVS system through various means. For example, in some embodiments, the e-commerce portal may allow the user to log in or connect to the system. In some embodiments, the e-commerce system may detect the user access through the user's interactions with the system's user interface (e.g. via a cookie or session tracking object provided by the client 110). The user access may occur via a call to the client API gateway 122 of the CVS system, as shown, or through another programmatic interface of the system.

When the user access is detected, embodiments of the CVS system will invoke 114 a cache population component 130 to load 118a pre-computed feature vectors from a persistent data store 134 into 118b a cache 150. The cache is used to store feature vectors of target images that will be analyzed by the visual search. For example, the target images may be images of products or items listed by the e-commerce service provider.

As shown, the cache population component 130 selects the feature vectors to load into the cache 150 by using an item category prediction model 132. This model 132 may be a machine learning model trained to predict item categories that are relevant to the user, based on user features 140 of the user. The user features 140 may be stored in another data store 140, and the cache population component may retrieve 116 the features of the current user by querying the data store. Based on the user's features, the prediction model 132 will infer one or more categories of products that the user is likely interested in, and populate the target image cache 150 with image feature vectors in those item categories 152a-c. In some embodiments, the target image cache 150 will be an in-memory data store, so that cached feature vectors can be accessed much more quickly than data stored in the persistent data store 134. In some embodiments, the pre-computed feature vectors data store 134 may organize the feature vectors into individual shards based on the item categories, so that they can be easily loaded collectively as a group.

In some embodiments, the feature vectors in data store 134 are previously computed for individual images of the items using one or more machine learning models. These feature vectors will be used as input to downstream machine learning models (e.g. model(s) 182) to perform the visual search. Thus, the pre-population of the cache 150 significantly improves execution performance of the CVS system. The user may specify the item categories to be searched in the visual search request. If a specified category is already loaded in the cache 150, the CVS system will use the cache to perform that portion of the search. If a specified category is not loaded in the cache 150, the CVS system may load that category from the data store 134. In some embodiments, if a user does not specify any particular item categories to be searched, the CVS system will search only the categories loaded in the cache. In some embodiments, if the CVS system experiences a cache miss, the user features 140 for that user will be updated so that such a miss is less likely to occur in the future.

In some embodiments, the item category prediction model 132 may be a clustering model. For example, the model 132 may obtain some features 140 of the user and classify the user based on the features into one of a number of clusters representing different user profiles. These user profiles will indicate different groups of "similar" users that are clustered together in the user feature space. In some embodiments, each cluster may indicate properties of the user profile, such as price sensitivity to certain items, brand preferences, targeted item recommendations, etc. The cache population component 130 may then use the identified cluster or profile of the user to select the item categories to be loaded into the cache 150.

Depending on the embodiment, the user features used by the item category prediction model may include a variety of user metadata. For example, the user features 140 may include demographic information about the user such as gender, age, location, etc. The user features 140 may also include the user's own stated preferences about different items. In some embodiments, the user features 140 may include temporal information such as products recently purchased or browsed by the user. In some embodiments, the item category prediction may also take into account other data such as targeted recommendations from external recommendation systems 119.

As shown, after the target image cache 150 is populated with feature vectors of target images in selected item categories, the CVS system may receive, via the client API gateway 122, a search request to search for items that include a query image 160. The query image 160 may be a logo, label, symbol, mark, or the like, that is displayed on the items. The query image 160 does not have to be an image that was previously seen by the ML models of the system (e.g. models 172 and 182). These models are able to detect a wide variety of query images without having been previously exposed to such images during model training. In some embodiments, the search request may also indicate non-visual search criteria based on other metadata (e.g. textual metadata) of the items.

In some embodiments, the client API gateway 122 may be implemented by one or more compute nodes configured to receive client requests directed to the client API of the CVS system. In some embodiments, the gateway 122 may be configured to invoke backend services such as the cache population service 130, feature converter service 170, and feature matching service 180 to perform search requests from clients. In some embodiments, the gateway 122 may monitor the current load of the service nodes in the backend services and balance request load across the service nodes. In some embodiments, the gateway 122 may cause the backend services to be automatically scaled (e.g. increase or decrease the number of service nodes) based on the current demand and load conditions of the services. In some embodiments, the gateway may be used to implement A/B testing of the backend services, for example, to determine user reactions to different service behaviors. The results of such testing may be used to optimize the behavior of the services.

As shown, in response to the search request from the client, the client API gateway 122 may issue a call 162 to the feature converter service 170. The feature converter service may employ one or more machine learning models 172 that are trained to convert the query image 160 into a feature vector to be used by the feature matching service 180. In some embodiments, the ML model 172 may be a convolutional neural network (CNN). Depending on the embodiment, the query image feature vector may be returned back to the gateway 122, or passed directed to the feature matching service 180. As shown in this example, the client API gateway issues a call 164 to the feature matching service 180 with the query image feature vector.

In some embodiments, the feature matching service 180 employs another machine learning model(s) 182 to compare query image feature vector to individual ones of the target image feature vectors. In some embodiments, the ML model(s) 182 are neural networks configured to consume the query image feature vector and one target image feature vector. The ML model 182 will then generate an output that indicates (1) whether a view of the query image is present in the target image, and (2) the location of the query image in the target image. In some embodiments, the location may be indicated as a rectangular bounding box within the target image. In some embodiments, the ML model 182 may also indicate a confidence value for its inference, which may be used to rank or filter the search results.

To perform the search, the feature matching service 180 will retrieve 184 the target image feature vectors 152*a-c* from the target image cache 150, and then execute the ML model 182 on individual ones of the target image feature vectors. In some embodiments, the feature matching service 180 will return results 186 that lists the target images that were matched to the query image 160. These results may be returned to the client API gateway 122 or, as shown, to a downstream component such as the search result personalization component 190 in this example. In some embodiments, execution within the feature matching service 180 may be parallelized over a pool of many compute nodes. In some embodiments, for a better user experience, the feature matching service 180 may return partial search results to the downstream components before the entire search is finished, and then subsequently update the match results with additional matches.

In some embodiments, the search result personalization component 190 is tasked with fetching the items corresponding to the list of matched target images and constructing the final search results 196 to be returned to the client. These search results will be personalized based on retrieved user features 192 of the user who issued the query. For example, certain items may be filtered out based on user preferences. In some embodiments, items in the search results may be ranked based on user features (e.g. the user's recent purchase history, recommendations suggested by external recommendation systems, etc.). In some embodiments, the personalization component 190 may be implemented as another service with its own API, and may employ one or more additional ML models.

As shown in this example, the search results 196 constructed by the search result personalization component 190 are returned 194 to the client via the client API gateway 122. In some embodiments, the results may be returned directly to the client 110 (e.g. to update the GUI or web interface on the client). As shown, the query results 196 may include a list of item images that contain a view or indication of the query image 160. Embodiments of the CVS system 120 are able to detect views of the query image even if the view is transformed, rotated, partially hidden, or obscured (e.g. due to poor image quality). If an item image contains multiple views of a query image, embodiments of the CVS system are able to identify each of the multiple views. Moreover, embodiments of the CVS system are able to detect a query image regardless of its size in relation the item image. For example, some matched images (e.g. the painting image in results 196) may contain a relatively large views of the query image that occupy substantially the entire target image (e.g. more than 70% of the entire image), while other matched images (e.g. the shirt image) may contain smaller views of the query image that are substantially smaller than the target image.

As discussed, the client may display a user interactive interface for the search, which can also be used to provide the search results 196. In some embodiments, the search results 196 may be sorted based on a degree of similarity between the query image 160 and the identified portion of the target image. The degree of similarity may be determined based on the confidence score outputted by ML model 182 of the feature matching service 180. As discussed, the results may also be sorted based on personalized factors associated with the user. In some embodiments, the rankings of the items in the search results may be configurable via the user interface. In some embodiments, the search results 196 may provide matching items along with a matching target image, and also a location indicator 198 (e.g. a bounding box) that identifies the location of the query image within the target image. The location indicator 198 may be provided based on the location output of the ML model 182.

In some embodiments, the search results 196 are provided in a manner that allows the user to interact with the results. For example, if the results are provided via a web browser, the results may include interactive elements that allow users to view and purchase the listed items, or indicate that the user is not interested in a particular item. In some embodiments, the user's interactions with the search results may be captured and used to update the user feature data 140, so that future search results can be better targeted to the user's observed preferences. In some embodiments, the search results GUI may allow the user to report that a particular identification of the query image is erroneous. Such reports may be used to generate additional training data for ML models 172 and 182, so that the accuracy of these models can be gradually improved.

In some embodiments, to improve system performance, the ML models used by the CVS system (e.g. ML models 172 and 182) are implemented using specialized hardware that use tensor processing units (TPUs). TPUs are AI accelerator application-specific integrated circuits (ASICs) that are specifically designed to execute neural networks. In some embodiments, such TPUs use a "bfloat16" format for floating point numerics, which allow for greater accuracy compared to integer numerics. In one embodiment, the TPUs were able to deliver up to 620 teraflops per TPU device and more than 100 petaflops in a TPU pod. This high performance was achieved as a result of a systolic array hardware architecture and the floating point format used by the system.

Figure 2:
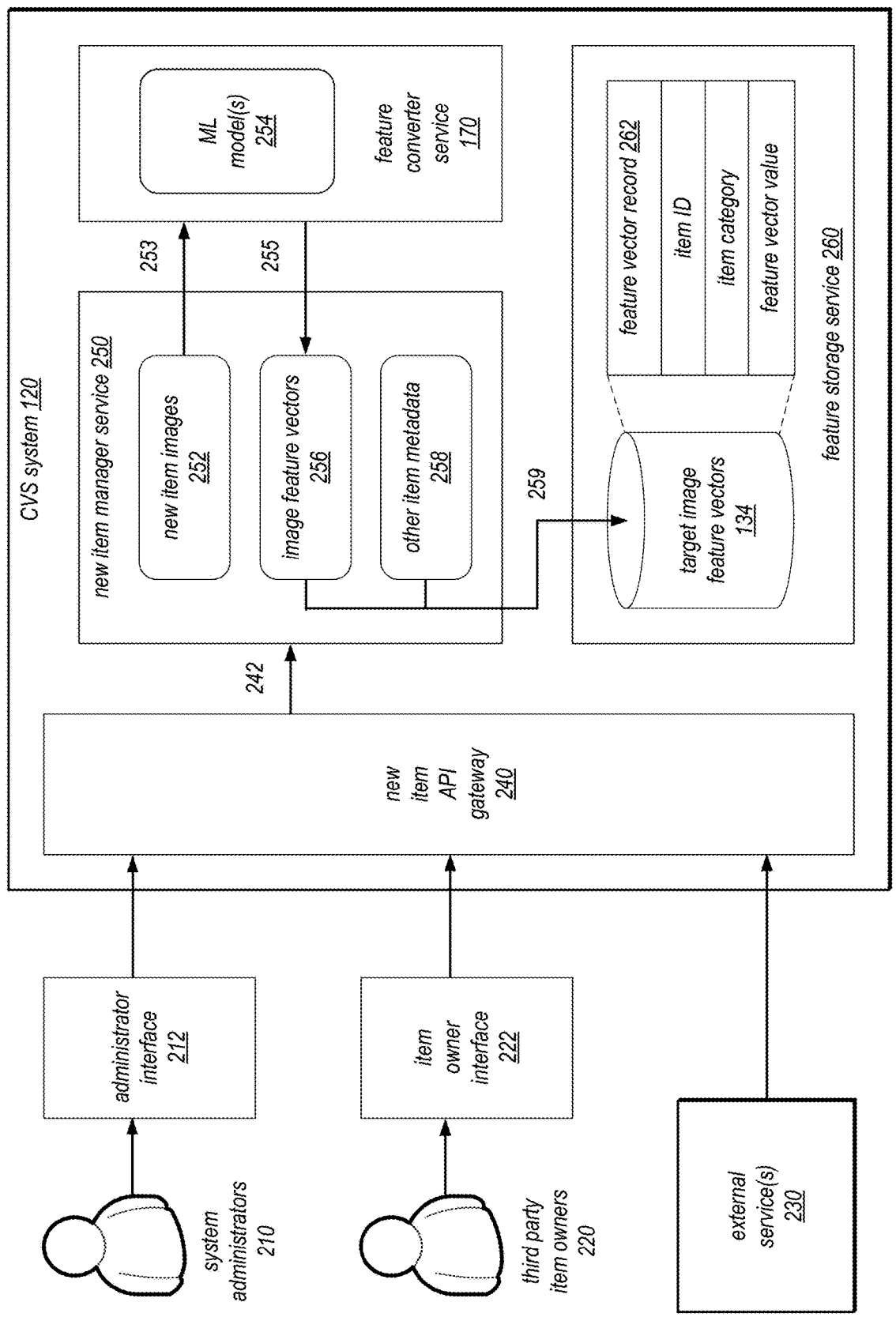
FIG. 2 illustrates components of the CVS system that allow users to add new items to the CVS system to be searched visually, according to some embodiments.

FIG. 2 illustrates components of the CVS system that allow users to add new items to the CVS system to be searched visually, according to some embodiments.

The CVS system 120 is not restricted for use on existing items. Rather, the system can be used as-is (e.g. without further model training), for new and unseen target images. While a retraining cadence can be set based on data shifts, supporting new target images that were not used to train the models is as simple as computing their features vectors, and the CVS system will be able to support visual searches of these new images. Nonetheless, in some embodiments, the ML models may be retrained on a scheduled basis (e.g. once a month) or in response to observed performance degradations.

As shown in the figure, new items and new target images may be received from different data sources. One source of new item information are system administrators 210, who may occasionally upload new item data via an administrator interface 212. Another source may be third party item owners 220, who may upload new item data via an item owner interface 222. In some embodiments, the e-commerce portal may allow many approved third-party item owners 220 to list their products on the portal via the item owner interface. Additionally, in some embodiments, external services 230 may also upload or update item information in the CVS system. New item information from these data sources may be received through the new item API gateway 240, which provides an API for adding new items. The new item API gateway 240 may be similar to the client API gateway 122 of FIG. 1.

As shown, when the new item data is received by the CVS system 120, the new item API gateway 240 will invoke 242 a new item manager service 250 and pass along the item information to the service. The new item information may include metadata about the item, such as a user-specified category, a description of the item, a price of the item, and one or more images of the item. In some embodiments, the new item manager service 250 may generate an item identifier that uniquely identifies the item in the CVS system.

As shown, the new item manager service 250 will process the new item information by converting the new item images 252 into corresponding item feature vectors 256. The conversion may be performed by sending 253 the images to the feature converter service 170 and receiving 255 the resulting feature vectors from the converter service. As shown, the feature converter service 170 uses a ML model 254 to convert the images into feature vectors. In some embodiments, the ML model 254 used to convert the new item images 252 may be similar to the ML model 172 used to convert the query image 160. In some embodiments, the two ML models may share a common structure (e.g. two CNNs that have the same number of layers and units). In some embodiments, ML models 172 and 254 may be implemented by the same model.

Once the feature vectors 256 are computed, they are saved 259 to the target image feature vector data store 134, along with other metadata about the new item 258. In some embodiments, the target image feature vector data store 134 may be managed by a feature storage service 260 with its own service API. In some embodiments, the feature storage service 260 may be responsible for managing the target image cache 150 of FIG. 1 and the population of the cache. In some embodiments, the target image feature vector data store 134 may act as the authoritative database for all item images in the CVS system.

As shown, in this example, the target image feature vector data store 134 will store many feature vector records 262, one for each item image. Each record 262 will indicate the item ID associated with the image, the item category of the item, and the feature vector value generated for the image. In one embodiment, the feature vector value for each image has a size of 16×16×512=131,072 float values used by the TPUs. In some embodiments, the TPUs used by the CVS system can support float values of different sizes (e.g. 16-bit values using 2 bytes or 32-bit values using 4 bytes). If each float value is four bytes, approximately 0.5 MB of storage space is needed to store the embedding of each target image. In some embodiments, the target image feature vector data store 134 may be a document database that stores information in JSON documents, and the feature vector records may be stored in a manner that groups images of the same item category in a common set of shard(s).

Once the feature vector of the image is stored, it may be read into the target image cache 150 for visual searching. In this manner, all new items can be prepared for search without updating the ML models of the CVS system.

In some embodiments, the generated feature vector records 262 may be used to perform automated compliance checks on the new items (e.g. based on pre-selected query images) to check whether the new item contains a required product label or does not contain a prohibited product image. In some embodiments, these compliance checks may be performed in real time so that results of the checks can be provided as interactive feedback to the clients 210, 220, 230. In some embodiments, the image feature vectors may also be used to generate additional item metadata about the new items.

Figure 3:
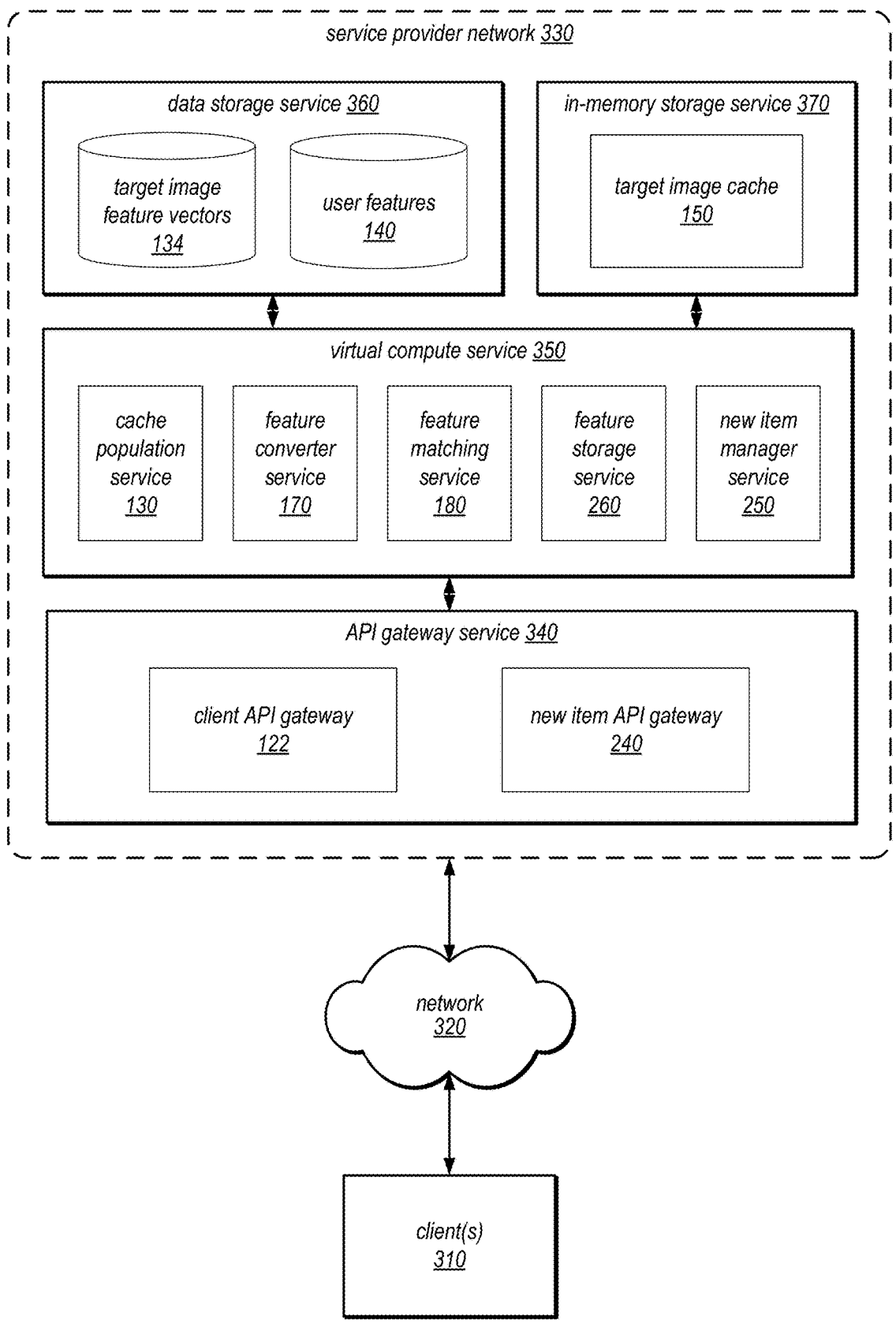
FIG. 3 illustrates an embodiment of the CVS system that is implemented using services in a cloud-based service provider network, according to some embodiments.

FIG. 3 illustrates an embodiment of the CVS system that is implemented using services in a cloud-based service provider network, according to some embodiments.

In the figure, service provider network 330 may be a private or closed system or may be set up by an entity such as a company or a public sector organization to provide one or more services (such as various types of cloud-based storage) accessible via the Internet and/or other networks to clients 310. Provider network 330 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 330. In some embodiments, provider network 330 may implement various computing resources or services, such as an API gateway service 340, a virtual compute service 350, a data storage service 360, and an in-memory storage service 370.

In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a system that includes a number of computing nodes (or simply, nodes), each of which may be similar to the computer system embodiment illustrated in FIG. 9 and described below. In various embodiments, the functionality of a given system or service component may be implemented by a particular node or may be distributed across several nodes. In some embodiments, a given node may implement the functionality of more than one service system component (e.g., more than one data store component).

In some embodiments, the API gateway service 340 is configured to provide custom service interfaces (e.g. RESTful or WebSocket interfaces) for client services hosted in the service provider network. As shown, the API gateway service 340 in this example is used to implement the client API gateway 122 and the new item API gateway 240. In some embodiments, each gateway may be implemented using a pool of gateway nodes responsible for marshalling and unmarshalling request and response data, encrypting and/or decrypting the requests and responses, and performing certain security functions such as prevention of denial-of-service attacks. In some embodiments, the API gateway service may automatically scale the pool of gateway nodes based on the level of service demand, so that more gateways nodes are provisioned when a spike in requests is observed, and fewer gateway nodes are maintained when the request volume is low. In some embodiments, the gateway nodes may be implemented as virtual machines or container instances hosted by the service provider network 330.

In some embodiments, the virtual compute service 350 is configured to provide compute instances (e.g. virtual machine or container instances) to support client services hosted in the service provider network 330. In this case, the virtual compute service 350 is used to support the cache population service 130, the feature converter service 170, the feature matching service 180, the feature storage service 260, and the new item manager service 250. Each of these services may be implemented by a pool of compute nodes that can be executed in parallel to handling a large number of client requests. As discussed, in some embodiments, the ML model used by these services may be hosted on specialized hardware, for example, servers that use TPU ASICs. As with the gateways, each of these services may be automatically scaled based on demand for the service In some embodiments, the data storage service 360 is configured to provide data storage capacity for services hosted in the service provider network 330. In this example, the data storage service 360 is used to implement the target image feature vectors data store 134 and the user features data store 140. The data storage services 360 may provide functionality for storing, accessing, and managing data on behalf of clients in the service provider network. For example, data storage service 360 may provide an enterprise-class database system that is highly scalable and extensible. Queries may be directed to a database in data storage service 360 that is distributed across multiple physical resources, and the database system may be scaled up or down on an as needed basis. In some embodiments, the data storage service 360 may store data in documents (e.g. JSON documents), in a manner that is easily searchable. In some embodiments, data stored in the data storage service 360 can be shared based on data attributes, so that data items having the same sharding attributes can be stored and fetched together.

In some embodiments, the in-memory storage service 370 is configured to provide in-memory storage capabilities for services hosted in the service provider network 330. As shown, the target image cache 150 may be implemented using the in-memory storage service 370. In some embodiments, the in-memory storage service 370 may provide a cluster of compute nodes to provide a large area of volatile memory, which may be used as an in-memory cache for other applications. The provided cache may be addressed according to a variety of access schemes. For example, the cache may be implemented using a key-value store, where each memory location is assigned a key. As another example, the cache memory may be organized as a linear or multi-dimensional array or map of memory locations, which may be divided into pages, lines, slices, etc. In some embodiments, the target image cache 150 may be configurable via a management interface, which may be used to start, stop, resize, or update the cache.

Generally speaking, clients 310 may encompass any type of client configurable to submit network-based requests to provider network 330 via network 320. For example, a given client 310 may include a suitable version of a web browser, or may include a plug-in module or other type of code module configured to execute as an extension to or within an execution environment provided by a web browser. Alternatively, a client 310 may encompass an application such as a database application (or user interface thereof), a media application, an office application or any other application that may make use of services provided by the service provider network. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, client 330 may be configured to generate network-based services requests according to a Representational State Transfer (REST)-style network-based services architecture, a document- or message-based network-based services architecture, or another suitable network-based services architecture.

In various embodiments, network 320 may encompass any suitable combination of networking hardware and protocols necessary to establish network-based-based communications between clients 310 and service provider network 330. For example, network 320 may generally encompass the various telecommunications networks and service providers that collectively implement the Internet. Network 320 may also include private networks such as local area networks (LANs) or wide area networks (WANs) as well as public or private wireless networks. For example, both a given client 310 and provider network 330 may be respectively provisioned within enterprises having their own internal networks. In such an embodiment, network 320 may include the hardware (e.g., modems, routers, switches, load balancers, proxy servers, etc.) and software (e.g., protocol stacks, accounting software, firewall/security software, etc.) necessary to establish a networking link between given client 310 and the Internet as well as between the Internet and provider network 330. It is noted that in some embodiments, clients 310 may communicate with provider network 330 using a private network circuit rather than the public Internet.

FIG. 4 illustrates an example graphical user interface that allows users perform visual searches of items in the CVS system, according to some embodiments.

As shown, GUI 400 implements a visual query interface that allows a user to issue queries for items using an image (e.g. query image 410). In some embodiments, the GUI 400 may be a web interface displayed on a client device (e.g. client device 110 of FIG. 1). For example, the client device may display the GUI 400 as a webpage on a web browser. The webpage may be configured to interface with the client API gateway 122 of the CVS system over the network.

As shown, the GUI 400 allows the user to specify a query image 410. The query image 410 may be uploaded by the user or fetched on behalf of the user via a web link. As shown, the user may use button 412 to choose another image for the query. In some embodiments, the user may be able to specify multiple query images for a visual query. In some embodiments, the GUI 400 may provide tools to edit the query image, for example, to crop the image, transform the image, or change image properties such as contrast or color.

As shown, in this example, the GUI 400 also allows the user to specify other non-image-based search criteria 420. Some of these criteria may be based on text-based metadata associated with the items, such as the item description, rating, and price, etc. In particular, the additional search criteria may include the item categories to use for the search. As shown, in some embodiments, the CVS system may use a cache population component 150 to predict these categories for the user. In some embodiments, if the user does not specify any item categories for the search, all item categories will be used. As shown, buttons 422, 424, and 426 are used to change the item categories, change the other search criteria, and execute the search, respectively.

The research results 430 of the visual query is shown on the bottom of the GUI 400. As discussed, the CVS system is able to return the search results for the visual query in real time, in a matter of seconds. In this example, four items are found by the visual search. The search result displays a matching item image that contains the query image for each of the items. In some embodiments, if an item has multiple matching images, the best matching image (e.g. image with the highest similarity score with the query image) is shown. The search results 430 also provide clickable links for each listed item, which may be clicked to view further details of the item or possibly purchase the item. Moreover, the search results also provide a "Not Interested" link that the user may use to indicate that he or she is not interested in a particular item. Such feedback by the user may be recorded as part of the user features and used to further personalize search results for the user in the future.

As shown, each item image in the search results also includes a location indicator 432, which shows the location of the query image in the item image. In some embodiments, an item image may include multiple views of the query image, and each view may be indicated by a different location indicator. The location indicator 432 may be provided as a rectangular bounding box or in another form recognizable by the user. Additionally, in this example, the search results are sorted based on a similarity score 434 of the item images. This similarity score 434 may be generated by the ML model(s) that analyzed the item images, and the score is used here as a sort parameter. Depending on the embodiment, the search results may be sorted based on a variety of configurable parameters, such as the size and number of views of the query image, the price of the items, the rating of the items, or other personalized factors associated with the user. As discussed, in some embodiments, the search result rankings may be determined based on another ML model, and may be influenced by the user's interactions with past search results. As shown, buttons 436 and 438 allow the user to manually filter the search results and sort the search results, based on the user's explicit instructions.

Figure 5:
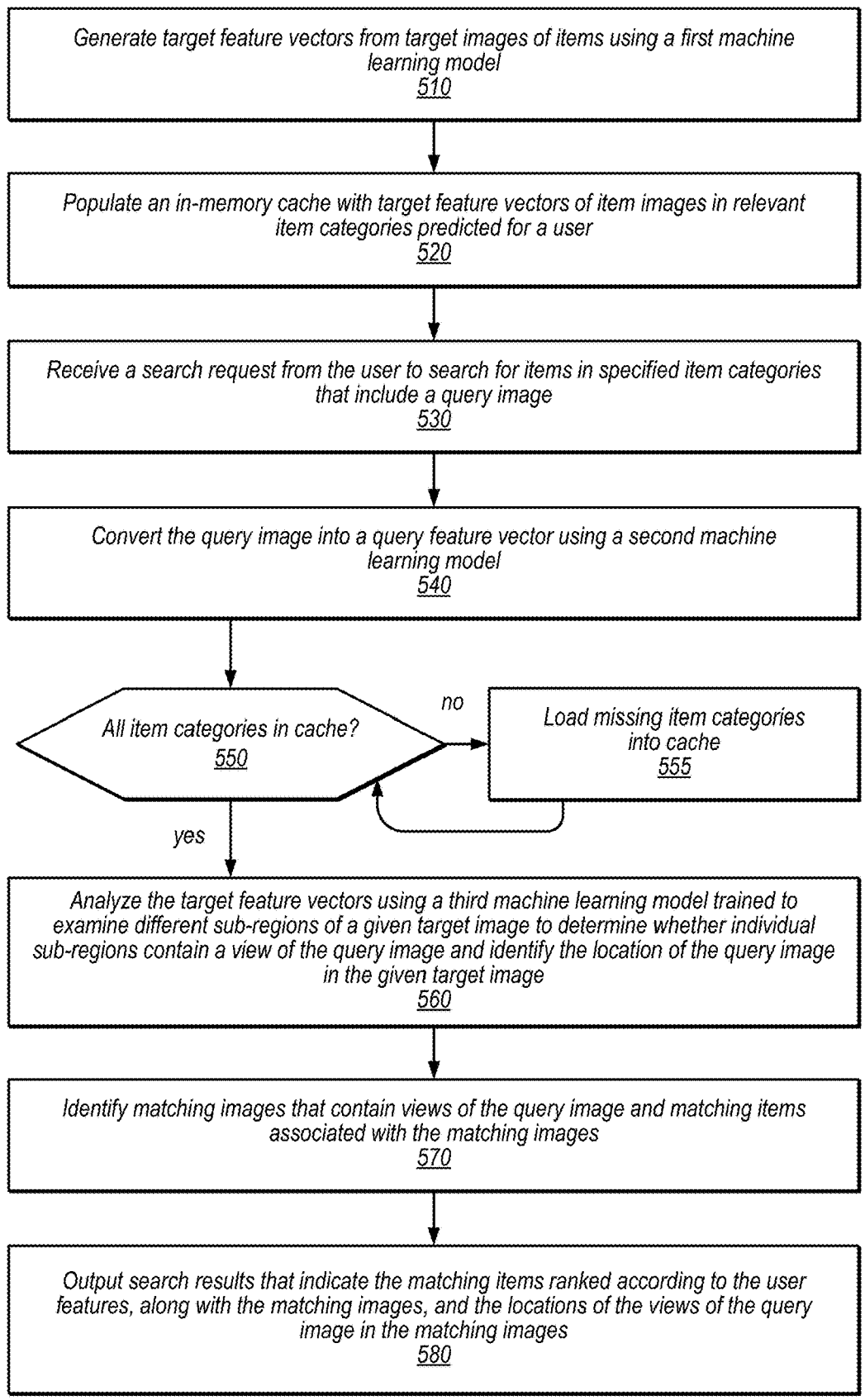
FIG. 5 is a flowchart illustrating a process performed by a CVS system to search for items based on a query image, according to some embodiments.

FIG. 5 is a flowchart illustrating a process performed by a CVS system (e.g. CVS system 120) to search for items based on a query image, according to some embodiments.

The process begins at operation 510, where target feature vectors are generated from target images of items using a first machine learning model (e.g. ML model 254 of the feature converter service 170). In some embodiments, the items may be retail products listed on an e-commerce portal, and the target images are images of the products. In some embodiments, target feature vectors may be generated for new images of new items as part of the onboarding process of the new items, as discussed in connection with FIG. 2. The generated feature vectors will be used for a downstream ML machine model to compare each of the target images with a query image to provide visual searching capabilities. The generated feature vectors may be stored in a data store such as the target image feature vector data store 134, which may be managed by a feature storage service 260, as discussed.

At operation 520, an in-memory cache is populated with target feature vectors of item images in relevant item categories predicted for a user. Operation 520 may be triggered by a detection of the user, for example, when the user first accesses or connects to the e-commerce portal. When that happens, in order to improve the performance of the visual search, a select subset of categories of items will be selected for the user based on the user's features (e.g. the user's demographic metadata, specified preferences, prior purchase history, etc.), and item image feature vectors associated with those categories are added to the cache for faster access. The cache may be target image cache 150 of FIG. 1, which may be managed by the feature storage service 260, as discussed. Operation 520 may be performed by a component such as cache population component 130 of FIG. 1.

At operation 530, a search request is received from the user. The search request is for a visual search to search for items in specified item categories that include a query image (e.g. query image 160 of 410). That is, the search request is seeking to identify target images of specified items that contain an indication or view of the query image. The query image may be an "unseen" image that was not used to train the ML models of the system. In some embodiments, the search request may be specified via a GUI such as GUI 400 of FIG. 4, and may be received by a component such as the client API gateway 122 of FIG. 1. In some embodiments, the search request may specify other non-visual search criteria that are not based on a query image, as shown in FIG. 4.

At operation 540, the query image is converted into a query feature vector using a second machine learning model (e.g. ML model 172 of the feature converter service 170). The conversion process may be performed in similar fashion as how the target images are converted into target image feature vectors in operation 510. In some embodiments, the two ML models used to convert the item images and the query image may be trained together as part of a larger neural network. In some embodiments, the two ML models may actually be the same model.

At operation 550, the CVS system determines where target feature vectors of all item categories specified by the search request are loaded in the cache. If not, the missing item categories are loaded from the feature vector data store into the cache. In some embodiments, such as miss may be used by the CVS system to update the user metadata, so that future cache pre-populations for the user will include the missed categories. When the feature vectors of all needed item categories are loaded into the cache, the process proceeds to operation 560.

At operation 560, the target feature vectors are analyzed using a third machine learning model (e.g. ML model 182 of the feature matching service 180). This ML model may be applied to each target feature vector to examine different sub-regions of a given target images and determine whether individual sub-regions contain a view or indication of the query image, and identify the location(s) of the detected view(s) of the query image in the target image. The examined sub-regions may be substantially smaller than the entire target image. Some examples of this "contains" relationship between the target image and the query image are shown in FIGS. 1 and 4. In some embodiments, the location of the query image may be indicated by a location indicator such as a bounding box. In some embodiments, the ML model may be trained together with the two converter models as part of the larger neural network (e.g. a one-shot detection network). Operation 560 may be performed in parallel by a large pool of worker threads, processes, or compute nodes to analyze each individual target feature vector with respect to the query feature vector.

At operation 570, the CVS system identifies matching images that contain views of the query image based on the output of the ML model 182. Further, matching items associated with the matching images are also identified. In some embodiments, each target feature vector may be stored in a feature vector record (e.g. feature vector record 262) that indicates the target image and item ID associated with the feature vector. In some embodiments, the matched items or images may be ranked based on a similarity score or metric, which may be outputted by the ML model 182. The similarity score may reflect a confidence level of the model's inference that the query image is present in the target image. In some embodiments, only results whose confidence level is above a certain threshold are included in the search results. In some embodiments, additional filtering or ranking may be performed on the search results based on the user's metadata by a component such as the search result personalization component 190 of FIG. 1.

At operation 580, the search results are outputted, for example via the GUI 400 of FIG. 4. The search results (e.g. search results 430) may indicate the matched items, ranked according to the user features. In some embodiments, the search results may indicate the matched item images and the determined locations of the query image views in the matched images, as shown in FIG. 4. In some embodiments, the search results may also indicate the similarity score for each matched item image with the query image. As discussed, using the techniques described herein, the visual search may be performed in real time to support an interactive user interface such as GUI 400 of FIG. 4.

Figure 6:
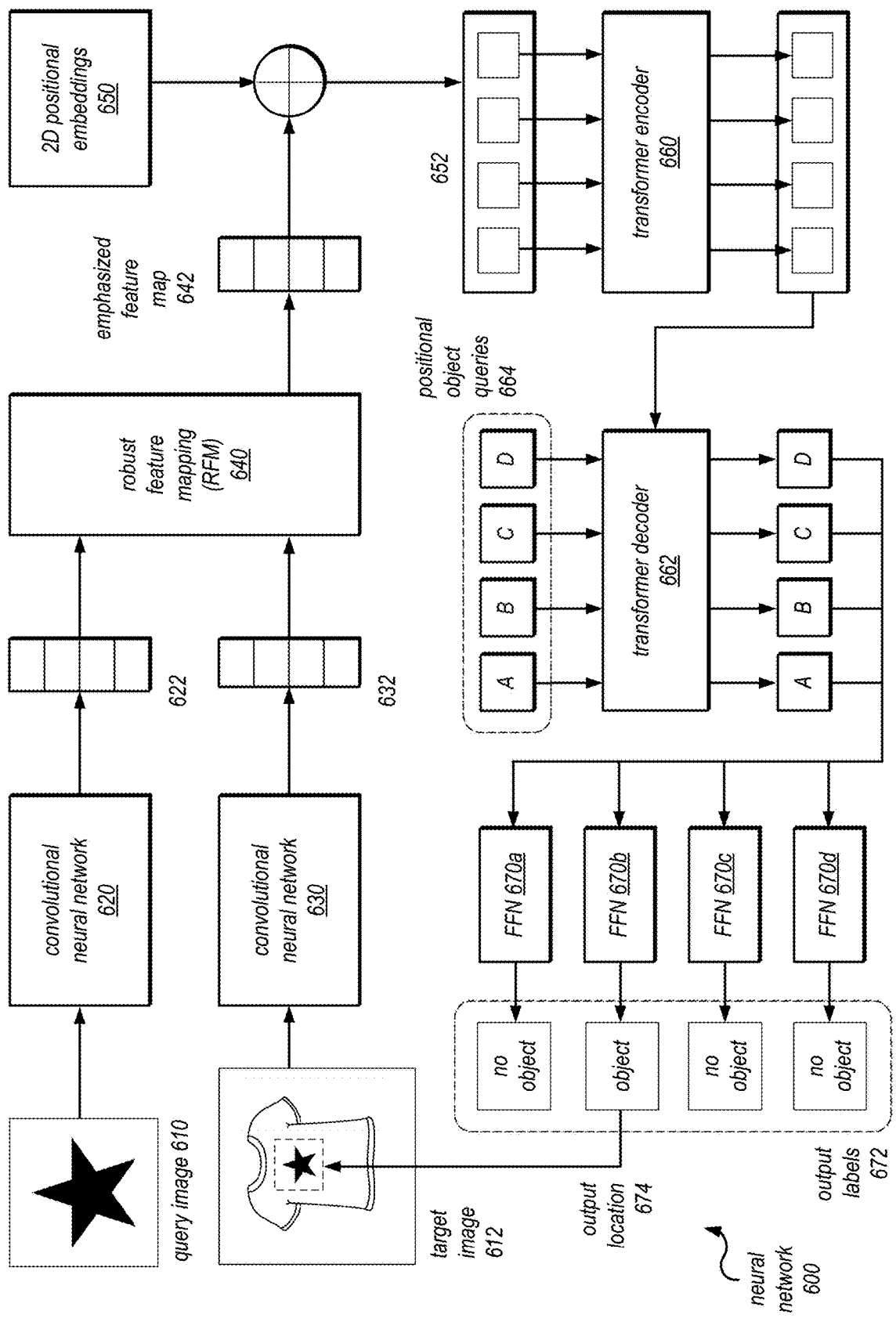
FIG. 6 a block diagram illustrating a neural network model used to implement the CVS system, according to some embodiments.

FIG. 6 a block diagram illustrating a neural network model used to implement the CVS system (e.g. CVS system 120), according to some embodiments.

In some embodiments, the ML models used by the CVS system may be trained together as a single deep learning neural network, such as neural network 600. In some embodiments, ML model 172 of the feature converter service 170 may be CNN 620 in the figure, ML model 254 of the feature converter service may be CNN 630, and ML model 182 of the feature matching service 180 may be the remaining portions of neural network 600. These portions of the combined neural network 600 may be separated after training and deployed to implement the different components of the CVS system.

Development of the neural network 600 for the CVS system is driven by a number of technical challenges. First, it is not possible to train the model on all possible query-target pairs that may be encountered by the CVS system. The query image is not known until search time and, even if known, the combinations of query-target pairs over a large item inventory would result in a combinatorial explosion. Hence, it is essential that the model is able to learn by example and generalize its learnings over unseen combinations.

In embodiments, the disclosed model is trained to perform a one-shot detection task, which aims to detect objects in a target scene using a single reference image called a query image. Previous research on one-shot detection has primarily focused on modifying two-stage object detectors to learn a metric for classifying proposed regions. However, these earlier methods rely heavily on the quality of initial region proposals, which cannot be guaranteed in the CVS system context.

Furthermore, the availability of large amounts of labeled data for model training is key to the success of deep learning in object detection tasks. However, while public dataset for generalized object detection are available, real-world domain-specific datasets for this type of application are costly and challenging to obtain. Models trained with limited data often tend to overfit the training distribution and fail to generalize.

To address these and other challenges, the disclosed neural network 600 implements an end-to-end neural network architecture for object detection at the scene level in a unified manner to locate objects of previously unseen classes. Embodiments of the disclosed network employ a Surfacing Positions using Transformers (SPOT) approach to detect the query image in the target image, and the model may be referred to herein as a SPOT model. The model takes inspiration from the way human visual systems function to perform an object detection task in an image using a representative example. To localize the query image, the model compares the representative example against different sections of the target image, extracts characteristic features, and builds correlations. The model does this while placing special attention on the features that differentiate the query image from the surrounding context in the target image. Properly trained, the model is able to detect the query image with great efficiency under wide variations in appearances, lighting conditions, viewing angles etc. Moreover, the resulting model can be generalized to query images of unseen classes that were not used during model training.

In some embodiments, the model accepts a query image and a target image as input. The input images are transformed into feature vectors via a backbone of convolutional residual networks (e.g. CNNs 620 and 630). In some embodiments, the model constructs a representation of the synergy between the query image features and the target image features using a learnable Robust Feature Mapping (RFM) module (e.g. RFM module 640), which emphasizes the features of the target image based on visual cues from the query image. In some embodiments, the model implements one or more transformers (e.g. transformer encoder 660 and transformer decoder 662) to perform a set of object queries 664 (encoded as learned positional embeddings) on different sub-regions of the encoded target image. If the query image is detected in a queried sub-region, the model outputs a class label 672 of the detected query image and the location 674 of the query image within the target image (e.g. the bounding box of the object query). If the query image is not detected by an object query, a class label of "no object" is outputted.

Advantageously, the disclosed model architecture effectively removes the need for hand-designed components that explicitly encode prior knowledge about the task. This is particularly important in the current context since the model needs to be able to generalize over unseen classes that cannot be encoded into the model a priori. The disclosed architecture avoids the encoding priors and focuses on matching the features between the query image and relevant sections of the target image determined by the RFM module.

The RFM module 640 may be implemented in different ways depending on the embodiment. In a first embodiment (referred to as SPOT V1 in Table 5 below), the RFM module is implemented separately from the transformer encoder 660. In a second embodiment (referred to as SPOT V2 in Table 5), the RFM module is implemented as part of the transformer encoder 660. This second embodiment is implemented by concatenating the query and target representations at the encoder input, and separating them before feeding the attended vectors to the decoder 662. The latter RFM module implementation, when trained with certain types of the contrastive loss function, is able to achieve comparable performance to the primary RFM implementation with slightly less parameters.

To build the training dataset for the model 600, a proxy dataset (e.g. datasets 710a-c) for object detection applications may be used as the starting point. Preferably, the proxy dataset will include images that contain distinct views of logos and/or pictograms. The images are classified into a set of categories (e.g. shirts, mugs, toys, etc.), which will form the supported categories for the CVS system. Once the image samples are selected, labeled regions of interest in the images are cropped out to create the query images. These query images are shuffled within a concept class (e.g. corresponding to a common logo or symbol) or replaced with a good-quality query image representing the class. The original image samples may be retained as the target images. The training dataset may be supplemented by applying transformations to the query image such as downscaling or padding the query image, or stitching multiple target images together. Additional synthetic target images may be generated by pasting the query images onto random backgrounds with the transformations. Depending on the training setting, all of these data curation steps may be automated and configurable.

Object detection as a task in this context has a dual objective of locating and classifying objects in a scene. The modern neural network-based object detection systems will first generate coarse region proposals using a proposal network (RPN), and then classify and fine-tune the proposed regions. Certain single stage detectors may skip the region-proposal step and directly predict on a fixed set of densely placed anchors, thus improving the inference speed for some loss in detection performance. However, these previous model designs generally rely on hand-designed components like a non-maximum suppression procedure or anchor generation that explicitly encodes prior knowledge about the task.

Although difficult to solve, one-shot learning models have a unique advantage that, once trained, the models can be used to detect objects of unseen classes without fine-tuning. Previous object detection research has proposed to use a metric learning approach and a two-stage architecture that replaces the standard classification head with a metric-based classification head. Some previous models used a RPN that did not depend on the target class and therefore relied heavily on the quality of class-agnostic region proposals, which cannot be guaranteed in a one-shot setting. Other models used attention mechanisms to influence the region proposals to generate class-specific proposals. However, because the quality of initial region proposals cannot be guaranteed in the one-shot setting, these earlier models produced inaccurate detection results and missed detections.

The problem of one-shot object detection may be formulated as the following. Consider the task of object detection over a set of class labels, denoted as $C_{all}$ with data $D_{all}$. The labeled set may be further divided into $C_{all}=C_{train} \cup C_{test}$, where $C_{train}$ includes those classes, which are available during training and $C_{test}$ comprises the ones unseen during training. $C_{train}$ can be reduced further to extract the validation label set $C_{val}$, such that $C_{train} \cap C_{val} = \emptyset$. $D_{train}$ and $D_{val}$ may be obtained in corresponding fashion. In practice, for constructing $D_{val}$ and $D_{test}$, a subset of training classes is used with $C_{val}$ and $C_{test}$ to evaluate the model's performance on both seen and unseen classes. The inference task of the one-shot detection system is to, given a query image patch q depicting an instance of a particular object class from $C_{all}$, uncover all the corresponding instance(s) of the same class in a target image t. Each target image may include at least one object instance of the class corresponding to the query.

To determine whether the two images q and t are similar to dissimilar, embodiments of the disclosed model will learn a function sim(q, t) that quantifies the similarity between images q and t. One way of constructing sim is by using a convolutional network f. In some embodiments, both of the images are passed through the same convolutional network (e.g. a Siamese network) to obtain feature vectors f(q) and f(t) respectively. The distance between these two vectors may be used as a measure of similarity.

$$\text{sim}(q,t) = g(f(q), f(t)) \quad (1)$$

Depending on the embodiment, the distance function g may be the Euclidean norm, or a more complex learnable function such as a neural network.

The next step in the task is to localize the object indicated in the query image q within the target image t, that is, to find the position of the object in the larger target image. One way of solving this problem is to implement a sliding window that slides over the larger image t and compare each patch of t with q. The location of q inside the large image t is found when there is a match between q and a patch in t. In some embodiments, if the convolutional network f is fully convolutional, then the larger image t can be passed through the same convolutional network f that was used to obtain a feature map f(t), where each "pixel" in the resulting feature map will be identical to the feature vector that would have been obtained from the corresponding window in the input image t. Subsequently, the feature vector f(q) may be compared with each pixel of the feature map f(t) to determine where the object of interest lies in t. Equation (2) below expresses the similarity score for such windows in t, where i and j are the accessors of f(t):

$$\text{sim}_{i,j}(q,t) = g(f(q), f_{i,j}(t)) \quad (2)$$

The above solution works well in situations where the scale of query image q closely matches the scale of the target image t, so that there is no need to align the scales of the two images. However, in practice, the scales of the query and target seen by the CVS system can be quite different. One possible approach to finding the correct scale is to construct image pyramids of varying scales and repeat the inference steps over each pyramid. However, such a model can incur very high latency and increased computational cost, which makes it impractical for an interactive system like the CVS system. Thus, in disclosed embodiments, (e.g. neural network 600), the localization problem is solved another way, by performing a finite set of object queries at relevant positions in the target image.

As shown, neural network 600 receives the query image 610 and target images 612 and extracts features from the two images using two respective convolutional neural networks 620 and 630. In some embodiments, the two CNNs 620 and 630 may be taken from the pre-trained ResNet50 CNN, by removing the fully connected layers and the global pooling layer of ResNet50. In some embodiments, CNNs 620 and 630 may actually be the same neural network configured to project the received images into a shared embedding space. The target and query images are encoded by this convolutional backbone to produce a sequence of hidden vectors, resulting in feature vectors 622 and 632.

In some embodiments, each CNN 620 and 630 will take as input a pair of initial images $x \in \mathbb{R}^{3 \times H_0 \times W_0}$, with three color channels. The CNN backbone generates a lower-resolution activation map $z \in \mathbb{R}^{C \times H \times W}$ where in one embodiment, $$H = \frac{H_t}{32} \text{ and } W = \frac{W_t}{32}.$$

Hence, at the end of these feature extraction layers, a pair of activation maps $$z_t = C \times \frac{H_t}{32} \times \frac{W_t}{32} \text{ and } z_q = C \times \frac{H_q}{32} \times \frac{W_q}{32}$$

is obtained. In some embodiments, these two sets of features are then subject to a 1×1 convolution to reduce the channel dimension of the high-level activation map z from C to a smaller dimension d, producing a new feature map $f \in \mathbb{R}^{d \times H \times W}$.

In most cases, the target images seen by the CVS system are expected to contain much more information than the query image. Since only a small region in t is supposed to match with q, directly comparing target and query features would not yield meaningful results. Hence, in some embodiments, the Robust Feature Mapping (RFM) module 640 is used to generate an emphasized feature map 642 that emphasizes regions in the target images that are likely to contain instances of the query image. In some embodiments, the RFM module accepts the target features f(t) and the query features f(q), and learns to emphasize the values in f(t) that are closer to the features in f(q). In some embodiments, the REM module views a feature tensor of size 2048×H×W as a collection of H×W patch-wise feature vectors, each of dimension 2048. The RFM module may use multiple learnable similarity function approximators, which function together as a bridge between f(t) and f(q), to emphasize those features in f(t) that bear close similarity with the feature vectors in f(q). If d is the dimension of f(q), the similarity function of equation (2) may be approximated by each similarity function as:

$$g(f(q), f_{i,j}(t)) = f_{i,j}(t)(w \times f(q)) \quad (3)$$

where w can be estimated as:

$$w = \text{softmax}\left(\frac{f(t)f(q)^T}{\sqrt{d}}\right) \quad (4)$$

In one embodiment, the RFM module 640 used eight such similarity approximators, which were combined in similar manner as in a multi-head attention mechanism. The output of this layer is a weighted sum of the values in f(q) for each feature value in f(t), where the weight assigned to each value of f(q) is determined by its similarity to the feature channels of f(t). In some embodiments, this layer produces a representation with the scores that capture the influence of query features f (q) for each feature value in the target features f (t). In this manner, the RFM module is able to generate an emphasized feature map 642 of the target image that emphasizes locations where an indication of the query image is likely present. The REM module 640 thus gives the model greater power to encode multiple relationships and nuances between f(q) and f(t).

To generate the emphasized feature vector, in some embodiments, new feature vector f(t)' may be constructed by combining the results of the similarity function for each patch $g_1, \ldots, g_M$, as shown in equation (5). In some embodiments, the output of the RFM module may be formulated as $f(t)_{emph}$, shown in equation (6), where L is the projection matrix for the target image.

$$f(t)' = [g_1, \ldots, g_M] \quad (5)$$

$$f(t)_{emph} = \text{layernorm}(f(t) + \text{dropout}(L_t f(t)')) \quad (6)$$

Depending on the embodiment, different forms of contractive loss may be used for the training. The different loss functions may be used to drive different type of similarities between the embedded representations of the query and the target at different stages of the network, so as to encourage the model to localize the regions that bear the "closest match" to the query.

In some embodiments, a first type of contrastive loss (CL1 in Table 5) is used. Loss CL1 forces similarity between the query representation $f_1(q)$ and target representation $f_1(t)$ at the output of the transformer encoder. For this loss, target and query tokens are introduced, which are effectively learnable embeddings that represent the query and target pairs. These tokens may be appended in the first positions of $f(q)$ and $f(t)$ respectively. That is, the new features become $[f_0(q); f_1(q)]$ and $[f_0(t); f_1(t)]$, where $f_0$ is a learnable function for the pair embeddings, approximated by the network. The positional embeddings 650 are added to the concatenated features and the results are fed to the transformer encoder 660. In some embodiments, the positional embeddings for the query positions are padded with zeros. The final loss is a contrastive loss using cosine similarities between the tokens $f_0(q)$ and $f_0(t)$.

In some embodiments, a second type of contrastive loss (CL2 in Table 5) is used. Loss CL2 forces similarity between the normalized query representation, $f_2(q)$, at the transformer encoder and each of the N normalized target representations, $f_2(t_i)$, at the output of the transformer decoder (N is the number of positional queries introduced at the decoder, $0 < i \leq N$). The final loss is a contrastive loss using cosine similarities between $f_2(q)$ and $f_2(t_i)$.

In some embodiments, a third type of contrastive loss (CL3 in Table 5) is used. Loss CL3 forces similarity between the channel-wise squeezed query representation, $f_3(q)$, at the backbone output and each of the N normalized target representations $f_2(t_i)$ at the output of the transformer decoder. The final loss is a negative log likelihood of the L1 distance between $f_3(q)$ and $f_2(t_i)$.

Depending on the embodiment, the two CNNs in the backbone of the model 600 may be shared or individually trained for the query and the target image. In Table 5 below, the shared backbone is denoted as BB.

As shown in the figure, network 600 next adds a set of 2D positional embeddings 650 to the emphasized feature vector 642 of the target image to conserve the spatial information. The resulting sequence 652 is fed into a transformer encoder 660. A transformer decoder 662 then takes as input a set of N learned embeddings called positional object queries 664, which can be viewed as slots that the model needs to fill with detected objects. In some embodiments, each object query will examine a different region of the encoded target image to determine if an instance of the query image is present in that region. As shown, these object queries 664 may be fed in parallel to the decoder 662, which uses cross-attention layers to look at the encoded target image 652 and infer the output embeddings for each of the object-queries 664. In some embodiments, the final representation of each object query 664 is independently decoded into box coordinates (e.g. output location 674) capturing the detected query image and class labels 672 indicating the inferred class of the query image. The decoding may be performed using a shared feed-forward layer of feed-forward networks 670a-d. In some embodiments, the number of object queries 664 implemented by the network 600 may act as an upper bound on the number of instances of the query image that can be detected simultaneously. Since the actual number of query image instances may be less than the number of queries N, in some embodiments, an extra class label is used to denote a finding of "no object."

In some embodiments, because the model 600 makes predictions on the object location 674 directly, use of an $l_1$ loss during model training will not be sufficient. For example, the $l_1$ loss will have different scales for small and large bounding boxes even when their relative errors are similar. Hence, in some embodiments, the loss is defined based on a linear combination of $l_1$ and Generalized Intersection over Union (GIoU) losses for bounding box regression, with weights $\lambda_{L1}=5$ and $\lambda_{iou}=2$ respectively. In one embodiment, N=25 decoder query slots are used. To find a bipartite matching between the predicted set and ground-truth boxes, the Hungarian algorithm is used to compute the optimal assignment. The matching cost takes into account both the class prediction 672 and the similarity of predicted and ground truth locations 674. Using this combination of techniques, the model can be trained to determine the location of the query image without a non-maximum suppression procedure.

In some embodiments, model training is performed using decoupled weight decay regularization with improved weight decay handling. The training may be performed using a batch size of 32 and be executed on four NVIDIA V100 GPUs in parallel. The CNN backbone may be fine-tuned, for example, to use a learning rate of $10^{-5}$. Having the backbone learning rate roughly an order of magnitude smaller than the rest of the network is shown to stabilize training, especially in the first few epochs. In some embodiments, the transformer may be trained with a learning rate of $10^{-4}$. An additive dropout of 0.1 may be applied after every multi-head attention in the transformer and FFN layer before layer normalization. In some embodiments, the training may use a training schedule of 100 epochs with a learning rate drop by a factor of 10 after 50 epochs. In one embodiment, the final model used weights from the 60th epoch, which was one of the best performing epochs based on the validation set.

Figure 7:
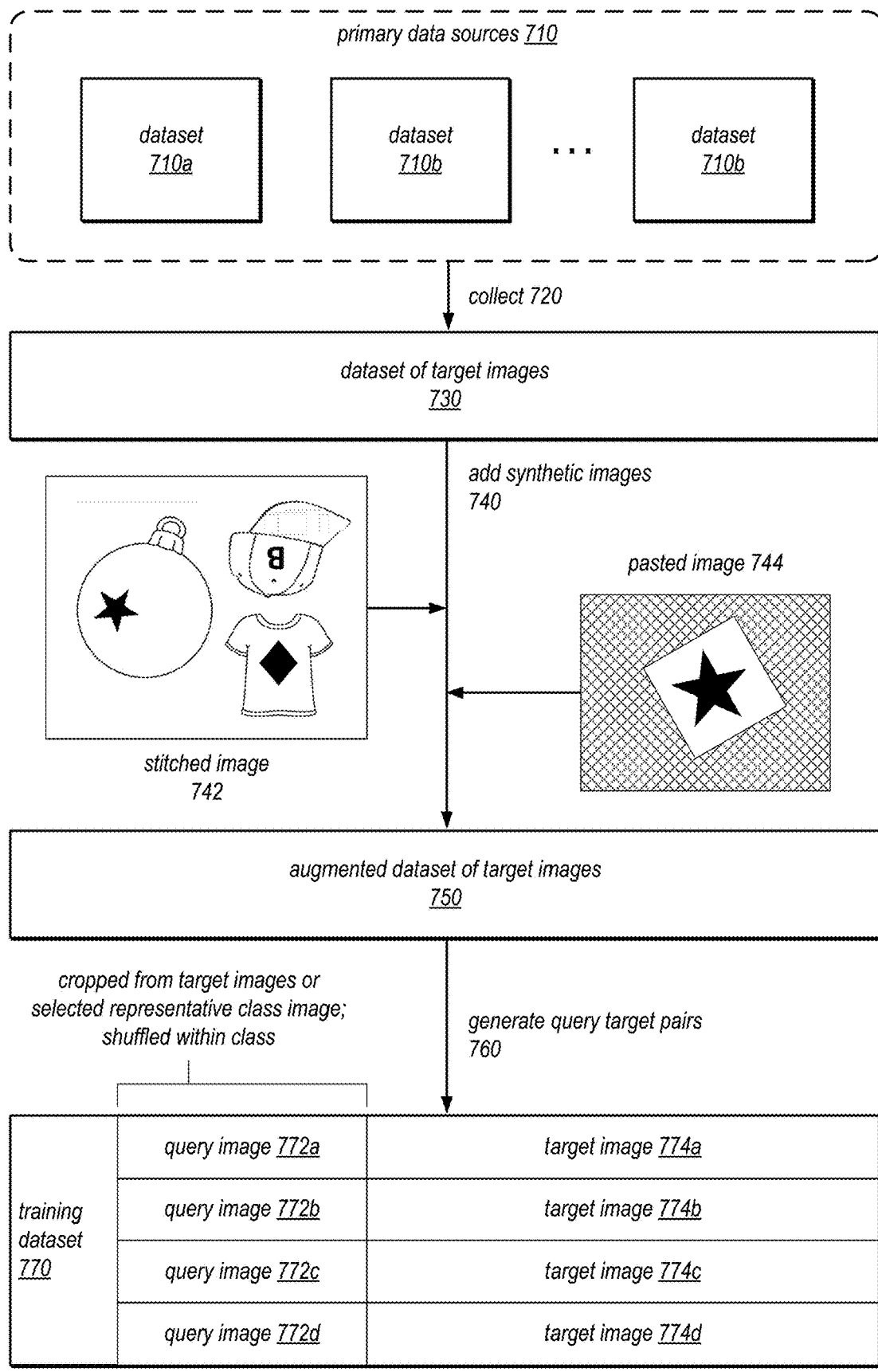
FIG. 7 illustrates a process of curating a dataset used to train the neural network model used to implement the CVS system, according to some embodiments.

FIG. 7 illustrates a process of curating a dataset used to train the neural network model (e.g. neural network 600) used to implement the CVS system, according to some embodiments.

In some embodiments, neural network 600 may be trained using a specially curated dataset, for example, training dataset 770 as shown in FIG. 7. In one embodiment, all target images in the dataset 770 are resized to 3×512×512 and all query images are resized to 3×256×256. An embodiment of the training dataset 770 may be referred to herein as LocateDS.

Embodiments of one-shot object detection models are well-suited for finding two-dimensional objects that have some regularity in the wild (e.g., road signs, logos, and pictograms). However, suitable datasets specifically curated for the one-shot detection task are difficult to find. Most attempts at building one-shot detection models currently use the VOC and COCO datasets, whose properties and distributions make the problem of one-shot object detection much more difficult. The LocateDS dataset was curated to address this need. In particular, the LocateDS dataset is developed using images from logo and pictogram domains. The dataset contains query-target image pairs for training network 600, labeled with the location (e.g. bounding box) annotations. The image data for LocateDS may be obtained from primary data sources 710, which may provide image datasets 710a-c such as machine annotated datasets LogoDet3K and Openlogo and manually annotated pictogram datasets such as those developed by the India Food Safety and Medical Devices program. Images from these datasets 710a-c may be labeled with regions of interest for object detection applications.

Table 1 below lists the data sources that were used to construct LocateDS, in one embodiment.

TABLE 1

Data sources used to construct LocateDS

| | |
|---|---|
| logodet3k | Unseen classes of images from LogoDet3K. |
| logodet3k_augmented | This source contains the "stitched" images from LogoDet3K source. |
| openlogo_multi | Openlogo images that contain multiple instances. These images were not selected for stitching. |
| openlogo_single | Openlogo images that contain single instances. These images were used for stitching. |
| md | Images curated for the medical devices. |
| ce | Additional annotated CE mark images. Remaining CE images are in md. |
| pdp | Images curated for India Food Safety. |
| synthetic | The "pasted" image source. |

In one embodiment, the primary contributors to LocateDS are logo and pictogram datasets. Selected images from the above datasets are collected 720 into an initial dataset 730 of target images. Classes of distinct logos and pictograms may be defined from the images in these data sources. The data sources md, pdp, and ce in Table 1 above contain pictogram related classes, which may be used to ensure the model is learning realistic transformations applicable for the pictogram domains.

Most of the image samples from existing data sources 710 comprise logo images where the regions of interest are quite large on an average. Many times, the whole image is taken up by a logo. Thus, to properly train the model to detect smaller regions of interest, synthetic image samples with smaller regions of interest were added, creating an augmented dataset 750. These synthetic image samples may be generated by padding the regions of interest in the original samples.

Additionally, synthetic images may be generated by randomly stitching multiple images from the logo datasets together to form a stitched image 742. Again, padding may be applied so that the region of interest in the resulting image is smaller. Since each stitched image may contain different logos, these samples are useful in training the model to focus on the query image in order to output the relevant region(s). The stitched source is particularly important because the target images in some data sources contain multiple different logo classes, so that the model must consider cues from the query image in order to identify the appropriate region.

Furthermore, synthetic image samples may be generated by randomly transforming the regions of interest and pasting them onto random backgrounds. In some embodiments, the pictograms selected for pasting may be limited to a minimum size.

As shown, the next step generates 760 query target pairs of the training dataset 770, which randomly pairs query images 772a-d with target images 774a-d. To generate the query images 772a-d for the target images, the regions of interest in the target images are cropped out based on the ground truth bounding boxes of the target images. In some embodiments, for unseen classes, the query image 772 may simply be chosen from a set of good quality representative images of the logo or pictogram from the same class. These query image patches 772 are then grouped by their associated classes and shuffled within the class, so that they can be treated as the same class during the pairing process. This step ensures that the generated queries are not always paired with targets containing that exact query image patch.

In some cases, the cropping procedure may yield very small and indiscernible queries and can be hard to identify even for humans. Hence, in some embodiments, query images that did not satisfy a minimum size are removed. In some embodiments, small query images may be replaced with larger query images from the same class.

In some embodiments, the curated dataset is separated into three splits: Train, Validation, and Test. In some embodiments, a fourth split, train-reduced, may be derived from the original Train split to serve as the comparison baseline between SPOT and a baseline model (e.g. a Co-Attention and Co-Excitation or CoAE model). Details about the splits are shown in Tables 2 and 3 below. In Table 2, the "#samples" column indicates the number of query-target pairs. Table 3 indicates the sample distribution across the different data sources used in the curated dataset, in one embodiment.

TABLE 2

Statistics for curated dataset splits

| Split | # classes | # samples | # annotations |
|---|---|---|---|
| Train | 2,481 | 89,955 | 116,094 |
| Train-reduced | 2,481 | 80,914 | 99,140 |
| Validation | 630 | 56,033 | 68,433 |
| Test | 354 | 30,500 | 30,500 |

TABLE 3

| Split | generation | stitched | pasted |
|---|---|---|---|
| Train | 70,153 | 43,531 | 2,380 |
| Train-reduced | 60,806 | 35,954 | 2,380 |
| Validation | 41,968 | 25,580 | 885 |
| Test | 18,282 | 12,218 | — |

Sample count by split and data source

| logodet 3k | logodet 3k aug. | openlogo multi | openlogo single | md | ce | pdp | synthetic |
|---|---|---|---|---|---|---|---|
| 13,186 | 34,674 | 24,047 | 21,553 | 17,527 | 1,650 | 1,047 | 2,380 |
| 13,806 | 30,505 | 18,084 | 17,727 | 14,060 | 1,562 | 1,016 | 2,380 |
| 30,699 | 23,577 | 6,852 | 4,676 | 1,641 | 103 | — | 885 |
| 14,071 | 10,942 | 356 | 3,068 | 1,668 | 170 | 225 | — |

In some embodiments, the Test split will contain a mix of seen and unseen classes. For the seen classes, the query images may be replaced with a standard good quality image. For the unseen classes, the largest query image in the class may be used. Thus, the query images were standardized to ensure the change in performance is due solely to the matching quality of queries in the targets and not to variations in the queries themselves. In some embodiments, these changes were not made to the Train and Validation splits, in order to encourage the model to treat each query-target pair independently of other observed samples.

In one study, an embodiment of the disclosed SPOT model was compared with the current state-of-the-art model for on-shot object detection (a Co-Attention and Co-Excitation or CoAE model). The CoAE model is a two-stage Faster R-CNN based model which uses non-local operations to explore the co-attention embodied in each query-target pair. The CoAE network includes a squeeze-and-co-excitation scheme that can adaptively determine relevant proposals and eventually the query objects. The predicted bounding boxes are subjected through a non-max suppression procedure to obtain the final box predictions. During the study, the CoAE model was trained using the training dataset discussed above (LocateDS), using the hyperparameter settings described in the CoAE author's original work, fine-tuned for LocateDS. The resulting CoAE model used weights from the 15th epoch of training, which displayed good performance in the validation set.

Tables 4A and 4B below compare the results of an embodiment of the SPOT model and the CoAE model on the curated dataset for both seen and unseen log related classes in terms of the Average Precision metric ($AP_{50}$). As shown, the SPOT model's performance exceeded the current state-of-the-art model for these classes. In some embodiments, the correspondences between the query and target pairs may be made stronger by reducing the noise level in the seeding datasets.

TABLE 4A

SPOT and CoAE results comparison (unseen classes)

| Method | Veg/Non-veg | FSSAI |
|---|---|---|
| SPOT | 79.23 | 45.90 |
| COAE | 64.62 | 29.09 |
| Counts | 13,667 | 11,896 |

TABLE 4B

SPOT and CoAE results comparison (seen classes)

| Method | BOTTEGA VENETA | PRADA | UNDER ARMOUR | MAXWELL HOUSE | THOMSON REUTERS |
|---|---|---|---|---|---|
| SPOT | 90.00 | 96.15 | 92.73 | 84.62 | 61.64 |
| COAE | 66.25 | 94.23 | 43.64 | 84.62 | 17.81 |
| Counts | 80 | 52 | 55 | 78 | 73 |

Tables 5A and 5B below compare the results of an embodiment of the SPOT model and the CoAE model on the curated dataset for certain pictogram related classes in terms of the Average Precision metric ($AP_{50}$). Tables 6A and 6B show the error analysis for pictogram classes for SPOT.

TABLE 5A

SPOT and CoAE results comparison
(India food safety)

| Method | Veg/Non-veg | FSSAI |
|---|---|---|
| SPOT | 80.4 | 72.6 |
| CoAE | 27.7 | 61.1 |
| Counts | 113 | 112 |

TABLE 5B

SPOT and CoAE results comparison (medical devices)

| Method | CE | CE/REP | IVD | LOT | MAN filled | MAN outline | MD | REF | STERILE | Storage |
|---|---|---|---|---|---|---|---|---|---|---|
| SPOT | 71.0 | 39.7 | 44.7 | 35.3 | 44.7 | 12.8 | 57.1 | 28.8 | 34.7 | 0.8 |
| CoAE | 87.3 | 48.9 | 40.8 | 48.4 | 75.2 | 29.8 | 92.9 | 63.8 | 42.1 | 48.1 |
| Counts | 723 | 131 | 76 | 190 | 226 | 47 | 14 | 177 | 121 | 133 |

TABLE 6A

Error analysis of SPOT (Indian food safety)

| Method | Veg/Non-veg | FSSAI |
|---|---|---|
| Counts | 113 | 112 |
| Avg. annotation area (AAA) | 6,272 | 11,477 |
| AAA - zero IoU | 196 | 545 |
| # zero IoU | 6 | 23 |
| % zero IoU | 5% | 12% |

TABLE 6B

Error analysis of SPOT (medical Devices)

| Method | CE | CE/REP | IVD | LOT | MAN filled | MAN outline | MD | REF | STERILE | Storage |
|---|---|---|---|---|---|---|---|---|---|---|
| Counts | 723 | 131 | 76 | 190 | 226 | 47 | 14 | 177 | 121 | 133 |
| AAA | 813 | 392 | 334 | 389 | 248 | 211 | 1,561 | 334 | 1,279 | 255 |

TABLE 6B-continued

Error analysis of SPOT (medical Devices)

| Method | CE | CE/REP | IVD | LOT | MAN filled | MAN outline | MD | REF | STERILE | Storage |
|---|---|---|---|---|---|---|---|---|---|---|
| AAA-zero IoU | 580 | 189 | 171 | 166 | 66 | 179 | 81 | 158 | 751 | 147 |
| # zero IoU | 68 | 48 | 30 | 65 | 62 | 31 | 3 | 54 | 21 | 58 |
| % zero IoU | 9% | 37% | 39% | 34% | 27% | 66% | 21% | 31% | 17% | 44% |

As shown, the studied embodiment of the SPOT model did not perform as well as the baseline model for a number of pictogram classes. This can be attributed to three primary reasons. First, as shown in Table 6B, most of the medical devices pictograms are very small. The CoAE model at its core is based on Faster R-CNN, which does better with smaller regions of interest. SPOT generally performed better in cases where the region of interest is larger. Second, SPOT appears to do worse than CoAE with pictograms that are text-like in appearance. SPOT did better with matching visual features. Third, CoAE's good performance on seen classes but not unseen classes may be attributed to the fact that two-stage model architectures are not very suitable for one-shot object detection solutions. This is because two-stage architectures encode some amount of prior information about the regions of interest in the region proposal network. However, the assumptions of this prior information may not hold true for unseen classes.

Table 7 below compares the results of different embodiments of the SPOT network on the curated dataset. The results are reported using the class agnostic Average Precision (AP) at 0.5 IoU. The study used all the classes of LogoDet3K, and stitched data were generated in the Test split to ablate the different designs of the RFM model. As shown, the SPOT V2 variant, in particular using the CL1 contrastive loss, is a close contender to the primary RFM implementation.

TABLE 7

Comparison of design aspects of SPOT

| Method | LogoDet3K classes | Stitched | # Parameters |
|---|---|---|---|
| SPOT V1 | 80.78 | 47.18 | 42,047,750 |
| SPOT V2 + CL1 | 80.54 | 45.67 | 41,817,862 |
| SPOT V2 − CL1 | 80.32 | 44.57 | 41,784,582 |
| SPOT V1 − BB + CL3 | 76.84 | 38.86 | 65,280,262 |
| SPOT V1 + CL3 | 79.08 | 47.21 | 42,047,750 |
| SPOT V2 + CL2 | 78.79 | 45.35 | 41,817,543 |

Figure 8:
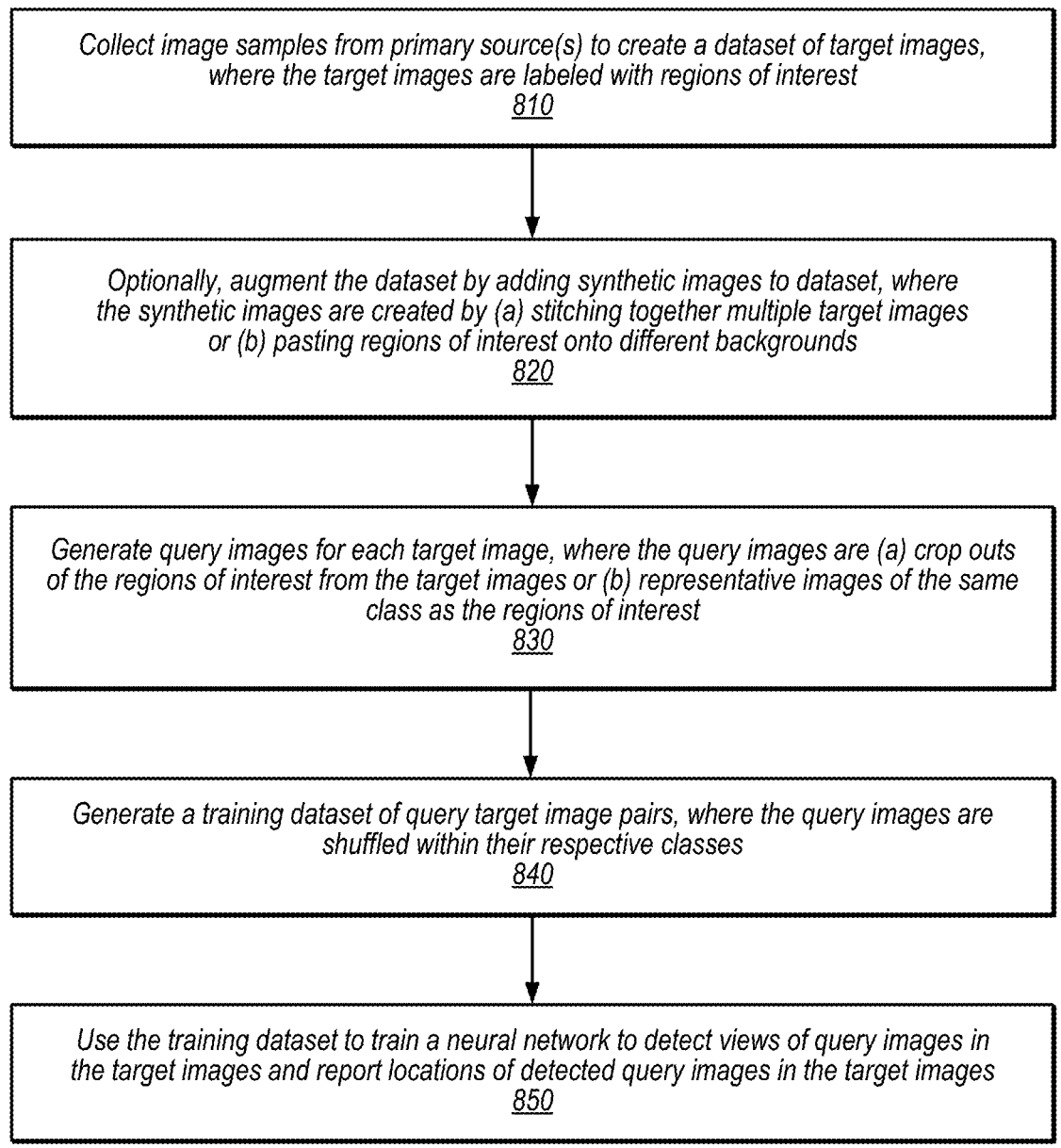
FIG. 8 is a flowchart illustrating a process of curating a dataset to train the neural network model used to implement the CVS system, according to some embodiments.

FIG. 8 is a flowchart illustrating a process of curating a dataset to train the neural network model (e.g. neural network 600) used to implement the CVS system, according to some embodiments.

The process begins at operation 810, where image samples are collected from a set of primary data sources. The primary data sources may include the data sources shown in Table 1. In some embodiments, the data sources may provide image datasets that include labeled regions of interest used for object detection applications. In some embodiments, these annotations may be applied after the collection. In some embodiments, the annotation may also indicate a class of an object located in the region of interest (e.g. a particular type of logo). In some embodiments, the collection process may select image samples that have large or prominent logos or pictograms. In some embodiments, operation 810 may be performed in an automated manner (e.g. based on program code) according to manually specified configuration parameters.

Operation 820 is operational. At operation 820, the dataset is augmented by adding synthetic target images. Depending on the embodiment, synthetic images may be generated in different ways. In some embodiments, synthetic images may be generated by stitching together multiple target images (e.g. stitched image 724). Aspects of this stitching process (e.g. the target images used, the scaling and locations of the target images) may be performed randomly. In some embodiments, synthetic images may be generated by pasting a region of interest onto a particular background, which may be a random background or a pre-selected background. Aspects of the pasting process (e.g. the background use, the size and location of the region of interest) may also be randomized. In some embodiments, the target images and regions of interest used to create these synthetic images may be padded or transformed. In some embodiments, the operation may be run multiple times to create synthetic images on top of synthetic images. In some embodiments, operation 820 may be performed in an automated manner (e.g. based on program code) according to manually specified configuration parameters.

At operation 830, query images are generated for each target image. The query image may be generated by cropping out regions of interest from the target images. In some embodiments, the query images may be pre-selected or random representative images that belong to the same class as the region of interest in the target image. In some embodiments, the generated query images may be scaled so that they are the same size. In some embodiments, the target images are also scaled to the same size. In some embodiments, query images that are smaller than a threshold size may be discarded or replaced with a larger representative query image for the class. In some embodiments, operation 830 may be performed in an automated manner (e.g. based on program code) according to manually specified configuration parameters.

At operation 840, a training dataset of query target image pairs is generated. The generation process may shuffle the query images with their respective classes before the pairing, so that the model can be trained to recognize variations of the query image in the target images. The training dataset may contain query target pairs where the target image contains the query image, as well as query target pairs where the target image does not contain the query image. In some embodiments, the training dataset may contain query target pairs where the target image contains multiple instances of the query image.

At operation 850, the training dataset is used to train a neural network (e.g. neural network 600) to detect views of query images in the target images, and also report locations of the query images in the target images. In some embodiments, the training dataset may be split into a training split, an evaluation split, and a testing split. The neural network may accept one query image and one target image as input, and output a class label indicating the detected query image as a result of one of a set of positional object queries, and a representation of a bounding box associated with the detected query image. The training may be performed as discussed previously in connection with FIG. 6. In some embodiments, the training may be performed in an automated manner (e.g. based on program code) according to manually specified configuration parameters.

Figure 9:
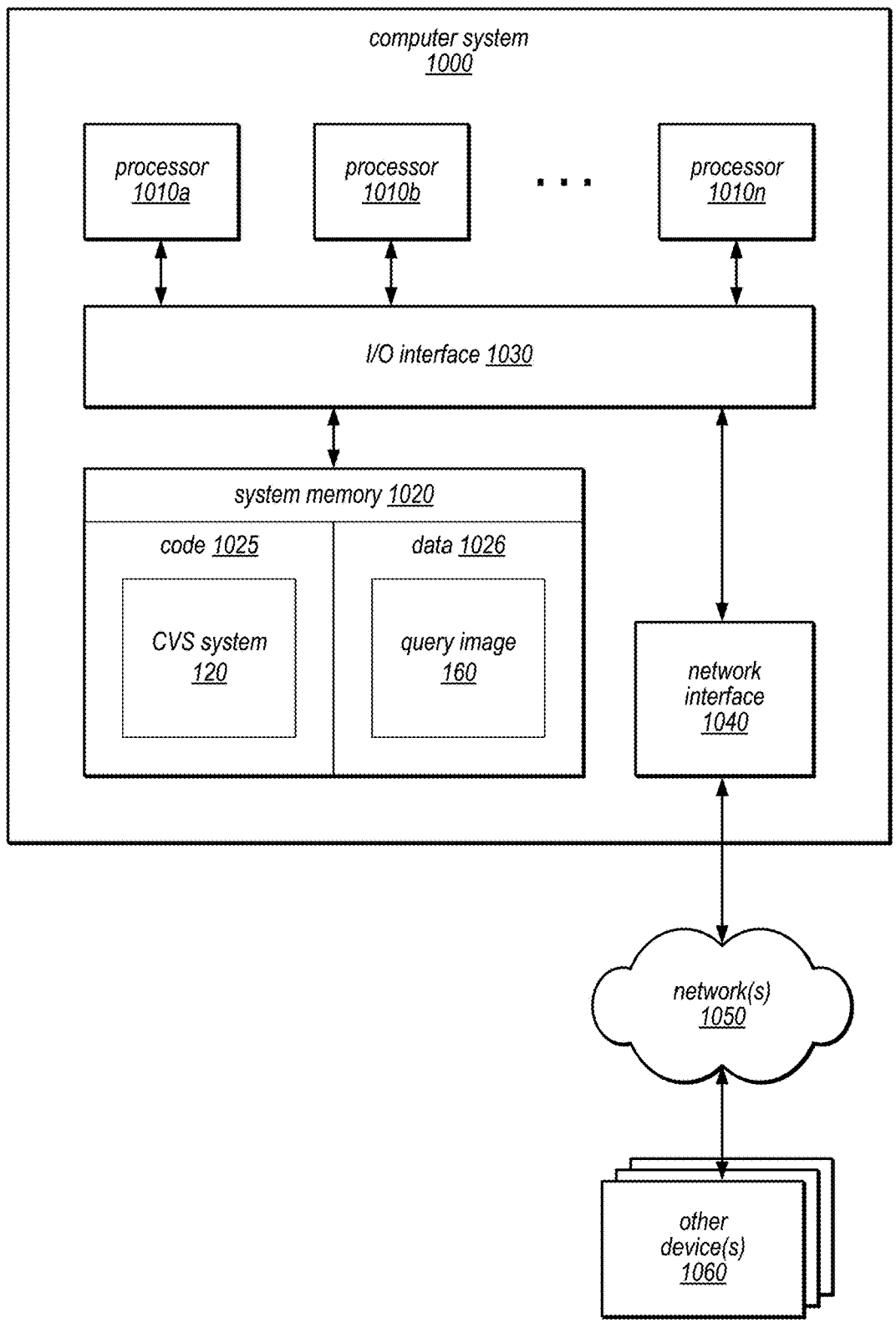
FIG. 9 is a block diagram illustrating an example computer system that can be used to implement one or more portions of a CVS system that enables users to search for items using a query image, according to some embodiments.

FIG. 9 is a block diagram illustrating an example computer system that can be used to implement one or more portions of a CVS system that enables users to search for items using a query image, according to some embodiments.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device. As shown, computer system 1000 includes one or more processors 1010, which may be the multithreading processor 140 of FIG. 1. These processors 1010 may have multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. In various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may store instructions that implement one or more portions of the CVS system 120, as discussed. The system memory 1020 may also be used to store data 1026 needed or produced by the executable instructions. For example, the in-memory data 1026 may be used to store the query image 160, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system comprising:
one or more computer devices that implement a contextualized visual search (CVS) system, configured to:
receive, via a user interface, a query image and a search request to search for items that display a pictogram that includes the query image;
convert, using a first machine learning model, the query image into a query feature vector;
analyze, using a second machine learning model, target feature vectors of target images of a plurality of items, wherein the second machine learning model is trained to examine different sub-regions of a given target image to (a) determine whether individual ones of the sub-regions contain a view of the query image and (b) identify one or more locations of one or more views of the query image in the given target image;
identify, based at least in part on the analysis, a set of matching images from the target images that contain views of the query image and a set of matching items associated with the matching images; and
output search results via the user interface, wherein the search results indicate the matching items, the matching images, and locations of the views of the query image in the matching images.

2. The system of claim 1, wherein:
the items are products listed on an e-commerce web portal; and
the user interface is a web interface that displays information about the products.

3. The system of claim 1, wherein the CVS system is configured to:
prior to receiving the search request:
generate the target feature vectors from the target images using the first machine learning model; and
store the target feature vectors in a data store in shards organized by item categories.

4. The system of claim 3, wherein the CVS system is configured to:
receive a request to add a new item to the CVS system, wherein the request indicates a new image of the new item and an item category of the new item;
generate a new target feature vector for the new image; and
store a record of the new image in the data store, wherein the record includes an identifier of the new item, the item category of the new item, and the new target feature vector.

5. The system of claim 1, wherein:
the search request is specified by a user; and
the CVS system configured to:
determine, prior to the search request, one or more item categories relevant to the user based on user features of the user and using an item category prediction model;
populate an in-memory cache with target feature vectors associated with the one or more item categories; and
perform the search request using the target feature vectors in the in-memory cache.

6. A method comprising:
performing, by a contextualized visual search (CVS) system implemented by one or more computers:
receiving a query image and a search request to search for items that display a pictogram that includes the query image;
converting, using a first machine learning model, the query image into a query feature vector;
analyzing, using a second machine learning model, target feature vectors of target images of a plurality of items, wherein the second machine learning model is trained to examine different sub-regions of a given target image to (a) determine whether individual ones of the sub-regions contain a view of the query image and (b) identify one or more locations of one or more views of the query image in the given target image;
identifying, based at least in part on the analysis, a set of matching images from the target images that contain views of the query image and a set of matching items associated with the matching images; and
outputting search results that indicate the matching items, the matching images, and locations of the views of the query image in the matching images.

7. The method of claim 6, further comprising performing, by the CVS system:
detecting a user accessing the CVS system prior to the user issuing the search request;
determining one or more item categories relevant to the user based on user features of the user and using an item category prediction model;
populating an in-memory cache with target feature vectors associated with the one or more item categories; and
performing the search request using the target feature vectors in the in-memory cache.

8. The method of claim 6, wherein:
the search request is issued by a user via an interactive user interface;
the search results are outputted via the interactive user interface; and
the matching items in the search results are ranked based at least in part on user features of the user.

9. The method of claim 8, further comprising performing, by the CVS system:
receiving one or more actions of the user on the search results; and
updating the user features of the user based at least in part on the one or more actions.

10. The method of claim 6, wherein:
the search request is received by a request gateway service configured to call a plurality of backend services including a feature converter service and a feature matching service;
the feature converter service is configured to perform the conversion of the query image; and
the feature matching service is configured to perform the analyzing of the target feature vectors.

11. The method of claim 6, further comprising performing, by the CVS system:
prior to receiving the search request:
generating the target feature vectors from the target images using the first machine learning model; and storing the target feature vectors in a data store in shards organized by item categories.

12. The method of claim 11, further comprising performing, by the CVS system:
receiving a request to add a new item to the CVS system, wherein the request indicates an image of the new item and an item category of the new item;
generating a new target feature vector for the image; and
storing a record of the image in the data store, wherein the record includes an identifier of the new item, the item category of the new item, and the new target feature vector.

13. The method of claim 6, wherein:
the first and second machine learning models are neural networks; and
the method comprises:
training the first and second machine learning models together as a one-shot object detection network; and
deploying the first and second machine learning models to implement different components of the CVS system after the training.

14. The method of claim 13, wherein:
the one-shot object detection network receives an input query image and an input target image and includes a learnable Robust Feature Matching module that outputs an emphasized feature vector that emphasizes sub-regions in the input target image that have similar features to the input query image.

15. The method of claim 13, wherein:
the one-shot object detection network includes one or more transformers that performs a set of positional object queries on different sub-regions of the input target image to detect the input query image in the different sub-regions.

16. The method of claim 13, further comprising:
obtaining a dataset of target images with annotated regions of interest;
cropping out the regions of interest as query images;
randomly generating query-target pairs from the query images and target images; and
using the query-target pairs as a training dataset to train the one-shot object detection network.

17. The method of claim 16, further comprising, prior to the generating of the query-target pairs:
generating and adding synthetic images to the dataset of target images, wherein the generating includes (a) stitching together multiple ones of the target images or (b) pasting regions of interest onto one or more random backgrounds.

18. One or more non-transitory computer-accessible storage media storing program instructions that when executed on or across one or more processors implement a contextualized visual search (CVS) system and cause the CVS system to:
receive a query image and a search request to search for items that display a pictogram that includes the query image;
convert, using a first machine learning model, the query image into a query feature vector;
analyze, using a second machine learning model, target feature vectors of target images of a plurality of items, wherein the second machine learning model is trained to examine different sub-regions of a given target image to (a) determine whether individual ones of the sub-regions contain a view of the query image and (b) identify one or more locations of one or more views of the query image in the given target image;
identify, based at least in part on the analysis, a set of matching images from the target images that contain views of the query image and a set of matching items associated with the matching images; and
output search results that indicate the matching items, the matching images, and locations of the views of the query image in the matching images.

19. The one or more non-transitory computer-accessible storage media of claim 18, wherein the pictogram is one or more of an icon, a logo, a sign, a mark, a label, and a symbol.

20. The one or more non-transitory computer-accessible storage media of claim 19, wherein the program instructions when executed on or across the one or more processors cause the CVS system to:
rank matching items in the search results based at least in part on the user features.

* * * * *